(12) United States Patent
Sekizawa et al.

(10) Patent No.: US 12,212,152 B2
(45) Date of Patent: Jan. 28, 2025

(54) WIRELESS POWER FEEDING SYSTEM, AND POWER RECEIVER HAVING CIRCULAR, SPHERICAL, OR POLYHEDRAL SHAPE

(71) Applicant: Raisontech Inc., Saitama (JP)

(72) Inventors: Yasushi Sekizawa, Saitama (JP); Kenji Tahara, Saitama (JP)

(73) Assignee: Raisontech Inc., Saitama (JP)

( * ) Notice: Subject to any disclaimer, the term of this patent is extended or adjusted under 35 U.S.C. 154(b) by 765 days.

(21) Appl. No.: 17/432,765

(22) PCT Filed: Feb. 17, 2020

(86) PCT No.: PCT/JP2020/005953
§ 371 (c)(1),
(2) Date: Feb. 10, 2022

(87) PCT Pub. No.: WO2020/170996
PCT Pub. Date: Aug. 27, 2020

(65) Prior Publication Data
US 2023/0013502 A1 Jan. 19, 2023

(30) Foreign Application Priority Data
Feb. 21, 2019 (JP) .................. 2019-029479

(51) Int. Cl.
*H02J 50/12* (2016.01)
*H02J 7/00* (2006.01)
(Continued)

(52) U.S. Cl.
CPC ............ *H02J 50/12* (2016.02); *H02J 7/0063* (2013.01); *H02J 7/0068* (2013.01); *H02J 50/005* (2020.01); *H04B 5/26* (2024.01)

(58) Field of Classification Search
CPC ........ H02J 50/12; H02J 50/005; H02J 7/0063; H02J 7/0068; H04B 5/26
(Continued)

(56) References Cited

U.S. PATENT DOCUMENTS

| | | | |
|---|---|---|---|
| 6,208,115 B1 * | 3/2001 | Binder | ............... H02J 7/02 320/108 |
| 8,436,576 B2 * | 5/2013 | Toya | ............... H02J 50/10 320/108 |

(Continued)

FOREIGN PATENT DOCUMENTS

| | | |
|---|---|---|
| CN | 2852415 Y | 12/2006 |
| JP | 2011-045236 A | 3/2011 |

(Continued)

*Primary Examiner* — Edward Tso
*Assistant Examiner* — Aaron Piggush
(74) *Attorney, Agent, or Firm* — Blank Rome LLP

(57) ABSTRACT

A wireless power feeding system comprising a power feeder and a power receiver including a power reception coil, a power reception circuit unit for recovering energy generated in the power reception coil, and an internal secondary battery for storing energy. Electric energy is supplied from the power feeder to the power receiver by means of electromagnetic induction using a resonance phenomenon. The power receiver has an outer shape identical to that of a conventional battery, and has a power receiver housing accommodating the power reception coil, the power reception circuit unit, and the internal secondary battery. Further, the power receiver has two electrodes disposed in positions identical to those of the conventional battery. Further, the power feeder includes a power feeding base on which the power receiver can be mounted.

8 Claims, 17 Drawing Sheets

(51) Int. Cl.
*H02J 50/00* (2016.01)
*H04B 5/26* (2024.01)

(58) Field of Classification Search
USPC .................................. 320/107, 108, 112, 114
See application file for complete search history.

(56) References Cited

U.S. PATENT DOCUMENTS

| | | | |
|---|---|---|---|
| 2008/0206627 A1* | 8/2008 | Wright | H01M 10/425 |
| | | | 429/93 |
| 2010/0194334 A1* | 8/2010 | Kirby | H02J 50/12 |
| | | | 320/108 |
| 2011/0175457 A1 | 7/2011 | Komiyama | |
| 2011/0248572 A1 | 10/2011 | Kozakai et al. | |
| 2012/0223585 A1 | 9/2012 | Urano | |
| 2012/0262109 A1* | 10/2012 | Toya | H01M 10/44 |
| | | | 320/108 |
| 2014/0132078 A1 | 5/2014 | Endo et al. | |
| 2014/0176067 A1* | 6/2014 | Suzuki | H02J 50/005 |
| | | | 320/108 |
| 2016/0189848 A1 | 6/2016 | Nam | |
| 2016/0301240 A1* | 10/2016 | Zeine | H02J 50/20 |
| 2017/0373524 A1* | 12/2017 | Wright | H02J 7/0045 |

FOREIGN PATENT DOCUMENTS

| | | |
|---|---|---|
| JP | 2011-151958 A | 8/2011 |
| JP | 2011-217596 A | 10/2011 |
| JP | 2011-223739 A | 11/2011 |
| JP | 2012-182975 A | 9/2012 |
| JP | 2012-231674 A | 11/2012 |
| JP | 2012-253944 | 12/2012 |
| JP | 2013-524743 A | 6/2013 |
| JP | 2013-162611 A | 8/2013 |
| JP | 2014-068507 A | 4/2014 |
| JP | 2014-176122 A | 9/2014 |
| JP | 2015-088376 A | 5/2015 |
| JP | 2017-028770 A | 2/2017 |
| JP | 2017-028998 A | 2/2017 |
| JP | 2017-163647 A | 9/2017 |
| KR | 10-2016-0078186 A | 7/2016 |
| WO | WO 2011/122048 A1 | 10/2011 |
| WO | WO 2013/021801 A1 | 2/2013 |

* cited by examiner (1)

Indicator  Power SW
Power cable
AC power (2) Receiver accommodating electronic apparatus

WIRELESS POWER FEEDING SYSTEM, AND POWER RECEIVER HAVING CIRCULAR, SPHERICAL, OR POLYHEDRAL SHAPE

TECHNICAL FIELD

The present disclosure relates to a wireless power feeding system, and more particularly, to a system using magnetic coupling of an LC resonant circuit.

BACKGROUND ART

In batteries, there are some secondary batteries that are charged by mounting them in dedicated chargers. Additionally, in wireless power feeding technology, suggestions are made on a large number of devices based on many methods and approaches. Among them, methods using electromagnetic induction are commonly well known.

Patent Literature 1 discloses a wireless power supply method and power supply system capable of supplying power for a relatively long distance through coupling by electromagnetic field resonance, and more widely enlarging a frequency utilization range. According to an electromagnetic field resonance wireless power supply method, in the case of wireless power supply in which a power transmission circuit of a power transmission device and a power reception circuit of a power reception device are coupled by electromagnetic field resonance, the power transmission device is brought into an electrically transient state where a current and/or a voltage is not stabilized by using different two frequency components f1 and f2 for a power source 2, setting a resonant frequency of the power transmission circuit at f1 and/or f2 and periodically changing a condition of the power transmission circuit. In the power reception device, a resonant frequency of the power reception circuit is set at (f2−f1) or (f1+f2) due to a hamming phenomenon and power in the frequency (f2−f1) or (f1+f2) is supplied to a load.

Patent Literature 2 discloses a simple wireless power supply device using a loop coil as a power transmission device. A power transmission loop coil disposed on a power transmission device extracts electric energy from a DC power supply, to generate periodically changing electromagnetic field resonance energy into space. A power reception loop coil disposed on a power reception device extracts the periodically changing electromagnetic field resonance energy from the space, as electric energy, to supply the power to a load. The power transmission loop coil and the power reception loop coil perform electromagnetic field resonance coupling to supply power from the power transmission device to the power reception device.

Patent Literature 3 discloses a wireless power supply system, having a plurality of relay devices, suppressing the deterioration of power transmission efficiency caused by the relay devices. A wireless power supply system includes: a power transmission device which transmits power to be supplied; the plurality of relay devices which relay the power transmitted from the power transmission device; a power reception device which receives the power relayed by the relay devices; and a control device which controls the relay devices to transmit power through a transmission route producing maximum power transmission efficiency among a plurality of transmission routes which transmit the power from the power transmission device to the power reception device through the relay devices.

Patent Literature 4 discloses increasing transmission efficiency of power of a magnetic resonance-type wireless power-feeding system. A magnetic resonance-type wireless power-feeding system includes: an AC power supply; a voltage converting coil connected to the AC power supply; a power-transmitting-side LC circuit; a power-receiving-side LC circuit; an impedance converting coil; a load connected to the impedance converting coil; and a transmission efficiency adjusting capacitor connected in parallel to the load. The power-transmitting-side LC circuit has a power-transmitting-side coil disposed near the voltage converting coil and excited by electromagnetic induction between the voltage converting coil and the power-transmitting-side coil; and a power-transmitting-side capacitor. The power-receiving-side LC circuit has a power-receiving-side coil resonating with the power-transmitting-side coil and a power-receiving-side capacitor. The impedance converting coil is disposed near the power-receiving-side LC circuit and is excited by electromagnetic induction between the power-receiving-side coil and the impedance converting coil. The transmission efficiency adjusting capacitor has capacitance so as to increase transmission efficiency of power from the AC power supply to the load.

Patent Literature 5 discloses a wireless power supply system having high versatility and high applicability for all power reception apparatuses. A wireless power supply system for supplying power in a non-contact manner from a power supply stand having a power supply unit to a power reception apparatus mounting a power reception unit comprises an intermediate member between the power supply stand and the power reception apparatus. The single power supply device can supply power to different power reception apparatuses. Further, arrangement of the power reception apparatus is allowed to be changed during power supply. Thereby, a wireless power supply system having high versatility and high applicability can be provided.

Patent Literature 6 discloses permitting power feeding from a power feeding unit to a power receiving unit in a wireless power feeding device even in a presence of the method, the size, and the shape mismatch between the power feeding unit and the power receiving unit, thereby widening a range of the power receiving unit in which the power feeding unit can feed power. A detachable converter is disposed between a power feeding unit and a power receiving unit. The converter functions to establish conformity of the apparent method, the size and the shape of the power receiving unit from the power feeding unit by using a magnetic circuit, an electrical passive element, power refeeding, or the likes.

Patent Literature 7 discloses wireless power-feeding device that allows high-efficiency power transmission even if the degree of coupling of a transmission coil and a reception coil is changed. A wireless power-feeding device comprises a resonant circuit and a multi-tone power supply, and transmits a power signal including any of electric field, magnetic field and electromagnetic field. The resonant circuit includes a transmission coil and a resonant capacitor that are connected in series to each other. The multi-tone power supply outputs, to the resonant circuit, a multi-tone signal in which sinusoidal signals having a plurality of frequencies are superimposed.

Patent Literature 8 discloses enhancing power transmission efficiency in a magnetic resonance type wireless power supply. A wireless power supply system makes a power supply coil and a receiving coil to be magnetically resonate, by making a capacitor and a power supply coil to be resonate. A resonance frequency, at this time, is f. The wireless power supply system supplies AC power of the resonance frequency f to the power supply coil, by alternately making a switching transistor and a switching transistor on or off.

Patent Literature 9 discloses efficiently controlling feeding power in wireless power feeding of a magnetic field resonance type. A wireless power-feeding device wirelessly feeds power from a power-feeding coil to a power-receiving coil based on a magnetic-field resonance phenomenon between the power-feeding coil and the power-receiving coil. A power transmission control circuit supplies AC power to the power-feeding coil at a driving frequency, thereby feeding the AC power from the power-feeding coil to the power-receiving coil. A phase detection circuit detects a phase difference between a voltage phase and a current phase of the AC power. Specifically, the phase detection circuit compares a first detection period in which a signal T2 is high level and a second detection period in which a signal S2 is high level, and then detects the phase difference by detecting the length of the period in which the first detection period and the second detection period are overlapped.

Patent Literature 10 discloses a power supply device, power reception device and wireless power supply system capable of suppressing increases in circuit scale, cost and power loss and implementing impedance adjustment on both sides of power supply and power reception. The power supply device comprises a power generation part for generating electric power to be supplied; a feed element formed from a coil to which electric power generated by the power generation part is supplied; a resonance element coupled by electromagnetic induction; an impedance detection part for detecting an impedance on the feed side; a variable matching part including an impedance matching function at a feeding point of the feed element of electric power according to a control signal; a storage part for storing impedance characteristic estimation information as a reference table; and a control part which obtains a state of the variable matching part to be adjusted from at least the detected impedance information and the reference table information of the storage part and outputs a control signal to the variable matching part so as to reach the obtained states.

Patent Literature 11 discloses stabilizing a load voltage in a magnetic field resonance type wireless power feeding. Power is fed from a power feeding coil to a power receiving coil by magnetic resonance. A VCO alternately turns on/off switching transistors Q1 and Q2 at a drive frequency fo, whereby an AC power is supplied to the power feeding coil and then the AC power is supplied from the power feeding coil to the power receiving coil. A phase detection circuit detects a phase difference between current and voltage phases, and the VCO adjusts the drive frequency fo such that the phase difference becomes zero. When a load voltage is changed, the detected voltage phase value is adjusted, and consequently the drive frequency fo is adjusted as well.

Patent Literature 12 discloses a power reception circuit which is capable of achieving a high Q value. A wireless power receiving apparatus receives a power signal S1 including one of an electric field, a magnetic field and an electromagnetic field transmitted from a wireless power supply apparatus. A reception coil L2 is configured to receive the power signal S1. A power storage capacitor C3 has a first terminal with a fixed electric potential. A first switch SW1 and a second switch SW2 are connected in series to form a closed loop with the reception coil L2 and their connection node N1 is connected to a second terminal of the power storage capacitor C3. A third switch SW3 and a fourth switch SW4 are sequentially installed in series on a path in parallel with the first switch SW1 and the second switch SW2, and the electric potential of their connection node N2 is fixed.

Patent Literature 13 discloses a power supplying apparatus, a power receiving apparatus and a wireless power supplying system, capable of obtaining frequency characteristics of wider bandwidth in magnetic field resonance type. The power supplying apparatus includes a power generator to generate power to be supplied, a power supplying element to receive the power generated by the power generator, and a plurality of resonance elements disposed at multiple stages and coupled to each other through a magnetic field resonance relationship, and one of the plurality of resonance elements being coupled to the power supplying element through electromagnetic induction.

FIG. 11 shows a basic circuit diagram of the existing wireless power feeding system. A phase detection circuit detects a difference in resonant frequency as the phase of frequency by periodically controlling the on/off of SW1, SW2, SW3 and SW4 where a series resonant circuit including a power feeding coil and a resonant condenser is installed on the side of a power feeder. Accordingly, electromagnetic induction from the power feeding coil is periodically stopped, and at a predetermined timing immediately after the stop, (by turning on SW1 and SW4 and turning off SW2 and SW3), radiation of electrical energy stored in a power receiving coil and a condenser of a power receiver in the form of electromagnetic waves at the same resonant frequency may be detected and determined as the phase difference. In this instance, in addition to the power feeding coil, a receiving coil dedicated to detecting the resonant frequency may be installed in the power feeder. In the series resonant circuit as shown in FIG. 11, when power supply is stopped, the supply of electrical energy from the power feeding coil is stopped, and during the time, on the contrary, it serves as a power receiving coil.

PATENT LITERATURES

Patent Literature 1: Japanese Patent Publication No. 2017-163647
Patent Literature 2: Japanese Patent Publication No. 2017-028998
Patent Literature 3: Japanese Patent Publication No. 2017-028770
Patent Literature 4: Japanese Patent Publication No. 2014-176122
Patent Literature 5: Japanese Patent Publication No. 2014-068507
Patent Literature 6: Japanese Patent Publication No. 2013-162611
Patent Literature 7: Japanese Patent Publication No. 2012-253944
Patent Literature 8: Japanese Patent Publication No. 2012-231674
Patent Literature 9: Japanese Patent Publication No. 2012-182975
Patent Literature 10: Japanese Patent Publication No. 2011-223739
Patent Literature 11: Japanese Patent Publication No. 2011-217596
Patent Literature 12: Japanese Patent Publication No. 2013-524743
Patent Literature 13: Japanese Patent Publication No. 2011-151958

Technical Problem

There are some electronic apparatuses using secondary batteries embedded therein. When the secondary battery runs out of energy, to charge the discharged secondary battery, it is general to remove the secondary battery from the electronic apparatus and mount the secondary battery in a dedicated charger. Additionally, to apply products using batteries to wireless power feeding, dedicated power feeding coils and electric circuits are necessary, and manufacturers need to develop new type devices.

For wireless power feeding, in some cases, resonant circuits are used. For a feeder side resonant circuit, a series resonant circuit or a parallel resonant circuit may be selected. The series resonant circuit is easy to transmit energy of large capacity, but there are large losses. On the other hand, as opposed to the series resonant circuit, the parallel resonant circuit is used to transmit energy of relatively small capacity, and is easy to make a stable resonant state. The existing common wireless power feeding uses a series resonant circuit on the side of the power feeder (see FIG. 11). Additionally, in general, frequency tuning is performed by detecting the resonant state, but the power feeder performs resonant state detection and frequency tuning by using a receiving coil for detection or switching the power feeding and power reception. Furthermore, a power receiver detects the resonant state and transmits information to the power feeder by any communication method (Qi standard, etc.). This structure causes a rise in the cost.

The present disclosure is directed to providing a power feeder that takes proper control in combination with a very simple power receiver and a wireless power feeding system comprising the combination. In other words, the present disclosure is directed to providing a system which enables wireless charging using the existing electronic apparatus.

Technical Solution

The inventors employ a parallel resonant circuit on the side of a power feeder. A power receiver has a very simple configuration. After the repeated trials and errors in an attempt to provide a wireless power feeding system that is easy to use according to this approach, finally they attained an appropriate system. Additionally, in the case of wireless power feeding from the power receiver to a cylinder like a battery, due to the shape of a ferrite coil and high orientation with respect to the magnetic flux from a power feeder, it is necessary to place the power receiver in a direction toward the power feeder, but a method of a power reception coil capable of receiving power in any direction by operating the ferrite coil is proposed. In this instance, a degradation risk of an operating unit installed is addressed. That is, in addition to employing the parallel resonant circuit on the power feeder side, the power receiver uses the ferrite coil capable of receiving power in any direction. The ferrite coil is a coil wound on one ferrite in two or three directions.

A wireless power feeding system according to the present disclosure includes a power feeder including a power feeding coil to generate electromagnetic waves, and a power feeding circuit unit to supply power to generate the electromagnetic waves in the power feeding coil; and a power receiver including a power reception coil to receive the electromagnetic waves emitted from the power feeding coil by electromagnetic induction, a power reception circuit unit to recover energy generated in the power reception coil, and an internal secondary battery to store the energy recovered by the power reception circuit unit, wherein electrical energy is supplied from the power feeder to the power receiver by the electromagnetic induction using a resonance phenomenon by a predetermined resonant frequency, the power receiver further includes a power receiver housing having an outer shape identical to that of an existing battery and configured to receive the power reception coil, the power reception circuit unit and the internal secondary battery, and two electrodes disposed in positions identical to those of the existing battery, the power feeder further includes a power feeding base in which the power receiver is placed, and the power receiver is mounted in a battery holder embedded in another electronic apparatus, and in the mounted state, when placed in the power feeding base together with the electronic apparatus, the power is supplied by charging the internal secondary battery by wireless power feeding from the power feeder to the power receiver, and at the same time, discharging to the another electronic apparatus.

Accordingly, the power receiver is handled in the same way as a battery, and it is embedded an electronic apparatus and can be charged when embedded in the electronic apparatus, and moreover, while it is charged, the power receiver may discharge (supply the power) to the electronic apparatus.

Additionally, in the wireless power feeding system according to the present disclosure, the power feeding circuit unit of the power feeder further includes a resonant condenser tuned to the resonant frequency to form a parallel resonant circuit in combination with the power feeding coil, a switching circuit which periodically repeats on (an operating state) and off (a resonant state) of power supply to the power feeding coil, a frequency tuning circuit to change a frequency of a power source supplied to the power feeding coil, a control circuit to control both the switching circuit and the frequency tuning circuit, and a resonant state sensor to detect a resonant state of the power feeding coil and output a detection signal to the frequency tuning circuit and the control circuit, and the control circuit is configured to set a power feeding frequency and an operating duration according to information from the resonant state sensor for an optimum resonant frequency and a stable resonant state, control the switching circuit and the frequency tuning circuit based on the settings, and stop the power feeding when an abnormal resonant state is determined. Accordingly, it is possible to achieve the power feeding by the power receiver.

Furthermore, the power receiver further includes an external secondary battery connection terminal for connection of an external secondary battery, and the external secondary battery is connected to the connection terminal to make a large capacity power receiver. Accordingly, it is possible to charge a secondary battery that is not placed in the power feeding base.

Additionally, the power reception coil embedded in the power receiver is a cylindrical or polygonal coil, and is an air core coil or a ferrite coil in which a coil is wound on a cylindrical or polygonal ferrite.

Accordingly, it is possible to provide the power reception coil having a shape for embedding in the power receiver housing having the same shape as the battery, thereby increasing diversity.

Furthermore, the power receiver housing has an identical shape to the existing battery, and the wireless power feeding system further includes a power reception coil support instrument which is rotatable to direct the power receiver toward a predetermined direction when the power receiver is placed in the power feeding base.

Accordingly, it is possible to direct the power reception coil toward the power feeder, thereby increasing the orientation of the power reception coil.

Additionally, the power feeding base has a shape, form or color representing a possible power feeding range, and has at least one groove, and the groove allows the power receiver housing to be placed without rolling in case that the power receiver housing is cylindrical, and is configured to place an electronic apparatus in which the power receiver is embedded.

Accordingly, it is possible to easily place the power receiver on the power feeding base.

A wireless power feeding system according to the present disclosure includes a power feeder including a power feeding coil to generate electromagnetic waves, and a power feeding circuit unit to supply power to generate the electromagnetic waves in the power feeding coil; and a power receiver including a power reception coil to receive the electromagnetic waves emitted from the power feeding coil by electromagnetic induction, a power reception circuit unit to recover energy generated from the power reception coil, and an internal secondary battery to store the energy recovered by the power reception circuit unit, wherein electrical energy is supplied from the power feeder to the power receiver by the electromagnetic induction using a resonance phenomenon by a predetermined resonant frequency, the power receiver further includes a power receiver housing having an outer shape identical to that of an existing battery, and configured to receive the power reception coil, the power reception circuit unit and the internal secondary battery, and two electrodes disposed in positions identical to those of the existing battery, the power feeder further includes a power feeding base in which the power receiver is placed, and the power reception coil of the power receiver is a ferrite coil having windings on one ferrite in a plurality of winding directions, each winding connected in series, the power reception coil through which a magnetic flux passes in any rotation direction to generate an electromotive force by the electromagnetic induction.

Accordingly, the power receiver may be cylindrical and face any direction, and on the premise, the power receiver is handled in the same way as a battery, and it is embedded an electronic apparatus and can be charged when embedded in the electronic apparatus, and moreover, while it is charged, the power receiver may discharge (supply the power) to the electronic apparatus.

Additionally, in the wireless power feeding system according to the present disclosure, the power feeding circuit unit of the power feeder further includes a resonant condenser tuned to the resonant frequency to form a parallel resonant circuit in combination with the power feeding coil, a switching circuit which periodically repeats on (an operating state) and off (a resonant state) of power supply to the power feeding coil, a frequency tuning circuit to change a frequency of a power source supplied to the power feeding coil, a control circuit to control both the switching circuit and the frequency tuning circuit, and a resonant state sensor to detect a resonant state of the power feeding coil and output a detection signal to the frequency tuning circuit and the control circuit, and the control circuit is configured to set a power feeding frequency and an operating duration according to information from the resonant state sensor for an optimum resonant frequency and a stable resonant state, control the switching circuit and the frequency tuning circuit based on the settings, and stop the power feeding when an abnormal resonant state is determined.

Accordingly, it is possible to achieve the power feeding by the power receiver.

Furthermore, the power receiver housing has an identical shape to the existing battery and is mounted on a battery holder embedded in another electronic apparatus, and in the mounted state, when placed in the power feeding base together with the electronic apparatus, the power is supplied by charging the internal secondary battery by wireless power feeding from the power feeder to the power receiver, and at the same time, discharging to the another electronic apparatus.

Additionally, in the power receiver, the internal secondary battery is embedded in a spherical or polygonal case, the winding of the ferrite coil as the power reception coil of the power receiver is a ferrite coil having windings on at least one ferrite in at least 3 directions, each winding connected in series, and even in case that the power receiver faces any direction with respect to the power feeder and is even rolling, the power is supplied by charging the internal secondary battery by wireless power feeding, and at the same time, discharging to the another electronic apparatus.

Advantageous Effects

The wireless power feeding system of the present disclosure includes the power receiver of the simple configuration, capable of charging the internal secondary battery in the power receiver, and at the same time, discharging (outputting as the battery) to the electronic apparatus.

Accordingly, the power receiver of the present disclosure that conforms to the shape of commercially available batteries, in which a power reception coil, a circuit unit and a battery are embedded, is mounted in place of a battery in an apparatus using the battery, and wireless charging works when mounted in the apparatus, thereby eliminating the need to remove the battery to charge the battery and achieving the apparatus capable of wireless power feeding without modification to the apparatus.

It is possible to suggest secondary batteries that are more convenient to use by solving the battery waste problem raising environmental issues.

Additionally, the second wireless power feeding system of the present disclosure uses a ferrite coil in the power receiver to receive power in any direction, thereby charging the internal secondary battery in the power receiver, and at the same time, discharging (outputting as the battery) to the electronic apparatus no matter what direction the power receiver faces.

Accordingly, the power receiver of the present disclosure conforms to the cylindrical shape such as commercially available batteries, in which a power reception coil which is a ferrite coil capable of receiving power in any direction, a circuit unit and a battery are embedded, is mounted in place of a battery in an apparatus using the battery, and wirelessly charging works when mounted in the apparatus, thereby eliminating the need to remove the battery to charge the battery and achieving the apparatus capable of wireless power feeding without modification to the apparatus.

It is possible to suggest secondary batteries that are more convenient to use by solving the battery waste problem raising environmental issues.

DETAILED DESCRIPTION

Hereinafter, a preferred embodiment for realizing a system of the present disclosure will be described with reference to the accompanying drawings.

Figure 1:
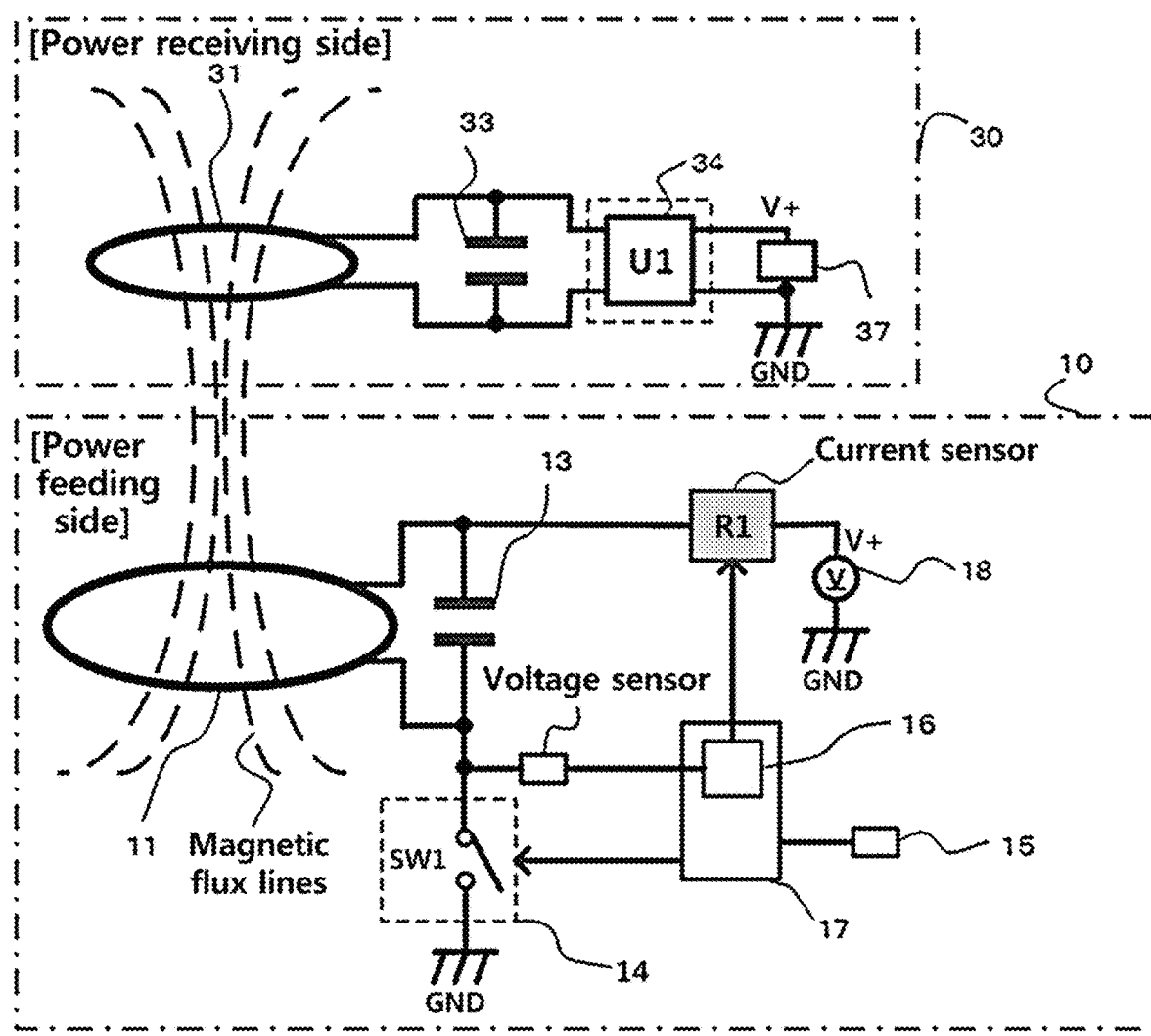
FIG. 1 is a basic circuit configuration diagram.

FIG. 1 is a basic circuit configuration diagram of a wireless power feeding system according to the present disclosure. The wireless power feeding system according to the present disclosure includes a combination of a power feeder 10 and a power receiver 30. Electrical energy is supplied from the power feeder 10 to the power receiver 30.

As shown in FIG. 1, the power receiver 30 includes a power reception coil 31, a condenser 33, a rectifier circuit 34 and an internal secondary battery 37.

Additionally, the condenser 33 may be connected to the power reception coil 31 in series or in parallel. In the present disclosure, parallel connection is preferred.

There are several features of the power receiver 30 side.

First, the internal secondary battery 37 is mounted in the power receiver 30.

Second, the power reception coil 31 installed in the power receiver 30 may be significantly different from the size, material or electrical specification of a power feeding coil 11 of the power feeder 10.

Third, the power receiver 30 is received in the existing battery or button cell type case and generates the equivalent electrical output to the battery and thus serves as a substitute for the battery.

The power feeder 10 includes the power feeding coil 11, a resonant condenser 13 that forms a resonant circuit with the power feeding coil 11, a switching circuit 14 to power on/off the power feeding coil 11, a frequency tuning circuit 15 (for example, a circuit including a phased lock loop (PLL) circuit) to tune the frequency supplied to the power feeding coil 11, a resonant state sensor 16 to detect the resonant state, and a power source 18.

The features of the power feeder 10 side are as follows.

First, the power feeding coil 11 and the resonant condenser 13 form a parallel resonant circuit. Second, there is one switch (two switches in the conventional art shown in FIG. 11). Third, the frequency and the power supply time are controlled by controlling the frequency tuning circuit 15 and the switching circuit 14 by a control circuit 17. Fourth, the resonant state sensor 16 detects the resonant state (mostly, a frequency mismatch), and in addition to the control, the control circuit 17 controls to stop the power feeding based on the detection results of the resonant state sensor 16.

FIG. 1 is a basic circuit diagram (close to a block diagram). In the basic circuit, the power feeding coil 11 generates electromagnetic waves to cause electromagnetic induction. The electrical circuit of the power feeder 10 includes at least the resonant condenser 13 and the power source 18, and forms a resonant relationship by a predetermined frequency with the power reception coil 31 of the power receiver 30. The frequency at this time is referred to as resonant frequency, and in general, frequencies from 100 kHz to 500 kHz are used. The resonant frequency used in the present disclosure is not particularly limited.

In the positional relationship or the state of the power receiver 30, there is a slight mismatch in the resonant frequency. For example, in the position or tilt of the power reception coil 31 of the power receiver 30, the situation gradually changes. Thus, when the power reception coil 31 enters the range in which the electromagnetic waves emitted from the power feeding coil 11 reach (the magnetic flux lines shown in FIG. 1), it is possible to supply energy. The power reception coil 31 entering the magnetic flux lines affects the power feeder in the form of a resonant frequency mismatch. When there is the resonant frequency mismatch, the efficiency of energy supply reduces.

The resonant state sensor 16 (for example, a circuit including a phase detection circuit using a current sensor and a voltage sensor) detects the frequency or phase mismatch, and the frequency tuning circuit 15 tunes the frequency of the power feeding coil 11 according to the frequency or phase. The frequency tuning circuit 15 may be, for example, a circuit which adjusts the capacity of the condenser.

It is necessary to add several factors to the frequency (or phase) tuning. Accordingly, it is preferred to install the control circuit 17 that controls according to a program using a microcontroller (an integrated circuit including a processor, a memory and a peripheral circuit) or a programmable logic device (an integrated circuit capable of defining and changing an internal logic circuit). The control circuit 17 is connected to the resonant state sensor 16 (the phase detection circuit). The resonant state sensor 16 detects the frequency or phase mismatch and transmits its signal to the control circuit 17. Accordingly, when a predetermined object other than the power receiver 30 approaches, the resonant state sensor 16 detects an abnormal frequency or phase and transmits its signal to the control circuit 17, to enable the control circuit 17 to stop the power feeding.

Figure 11:
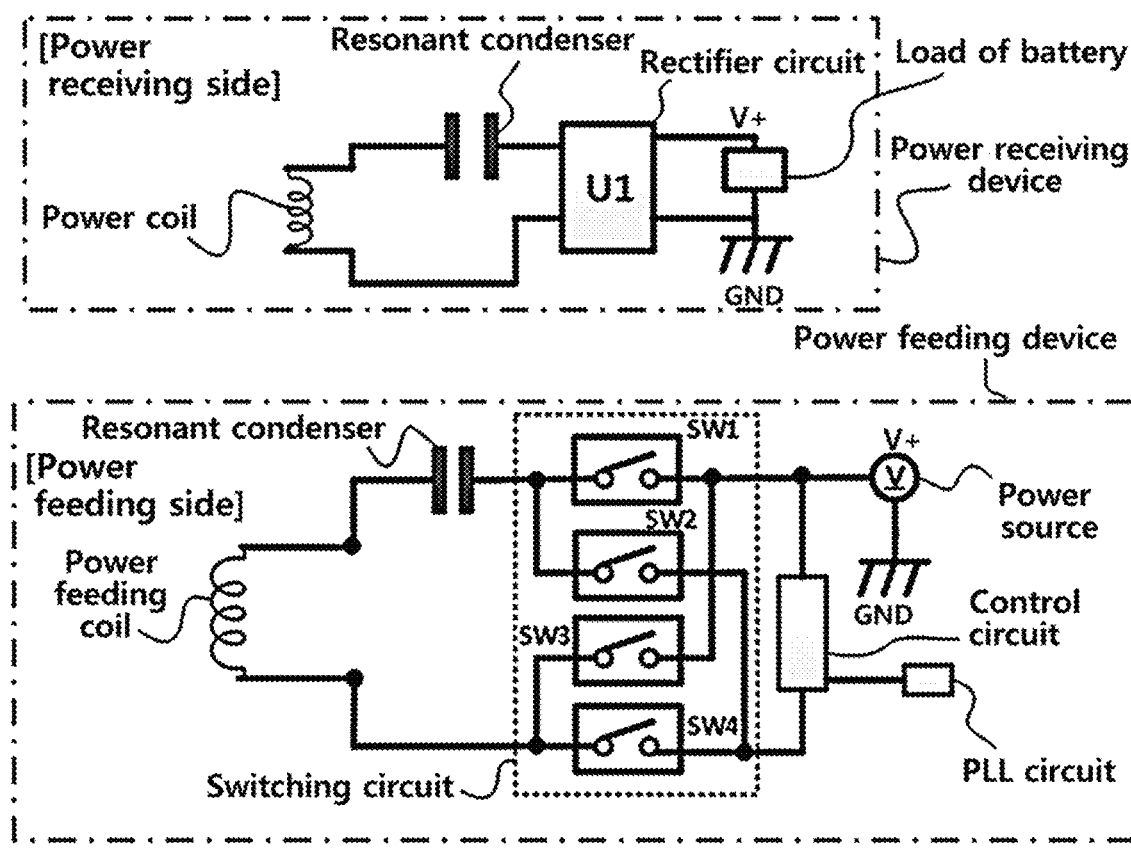
FIG. 11 is an existing circuit configuration diagram.

The configuration of the basic circuit diagram described above is in common with the existing basic circuit shown in FIG. 11. However, in the existing power feeder shown in FIG. 11, the condenser is connected in series to the power feeding coil, and the reference of the resonant frequency may be adjusted according to the specification of the condenser. The existing circuit connection method is commonly referred to as a series resonant circuit.

In contrast, the circuit of the power feeder 10 of the wireless power feeding system in the present disclosure shown in FIG. 1 employs a parallel resonant circuit.

Additionally, in the conventional art example shown in FIG. 11, periodically, resonation at the power feeding coil is stopped to detect a frequency mismatch. In contrast, the circuit of FIG. 1 uses a method of detecting the resonant state without stopping the power feeding to the power feeding coil 11.

The wireless power feeding system of the present disclosure includes the basic circuit shown in FIG. 1. As opposed to the conventional art example shown in FIG. 11, the resonant condenser 13 of the power feeder 10 is connected in parallel to the power feeding coil 11. The circuit including the resonant condenser 13 is commonly referred to as a parallel resonant circuit.

In the case of the parallel resonant circuit, when SW1 is turned on, leading to a stable resonant state, and then SW1 is turned off, the power feeder 10 continues the resonant state with the power receiver 30 during the radiation of energy stored in the power reception coil 31 and the condenser 33. The on/off timing of the SW1 is controlled using the PLL circuit. Here, based on the resonant state shift detected by the resonant state sensor 16 connected in parallel to the power feeding coil 11, the frequency tuning circuit 15 and the control circuit 17 achieve power supply of a suitable frequency. The resonant state sensor 16 is a sensor that detects the resonant state, and detects voltage and current shifts and the phase of the resonant frequency.

In the circuit of FIG. 1, compared to the conventional art example shown in FIG. 11, it is difficult to clearly detect the phase mismatch in the resonant frequency of the power receiver 30. However, it is possible to process simple determinations as to whether to increase or decrease the resonant frequency or maintain the resonant frequency by simulations on many situations obtained by the resonant state sensor 16 and programming based on the simulations. Furthermore, it is possible to control through trials and errors by detecting changes of results after the tuning and determining whether it is suitable or not.

Figure 2:
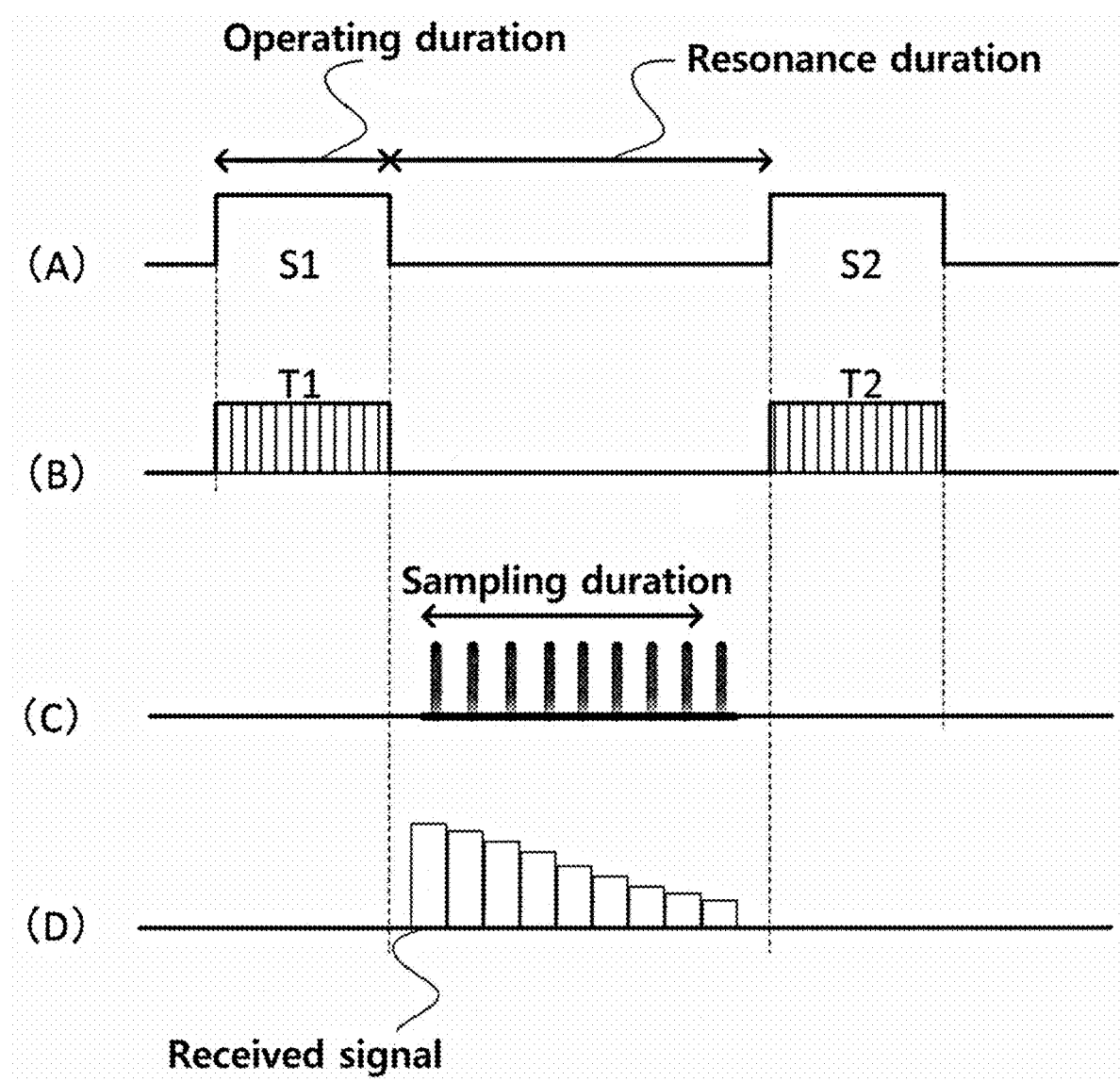
FIG. 2 is a timing diagram of a basic circuit.

FIG. 2 is a schematic signal waveform diagram of the basic circuit of the power feeder 10 shown in FIG. 1. (A) of FIG. 2 shows the waveform of the switching circuit 14 shown in FIG. 1 when switched on at high. In brief, when switched on, the power source 18 is supplied, leading to an operating state, i.e., the operating duration. The switched off and non-operating duration leads to a resonant state, i.e., the resonance duration.

As shown in FIG. 1, when the power feeding coil 11 and the resonant condenser 13 forms the parallel resonant circuit, no matter when it is in the operating state or the resonant state, the power feeder 10 continues to supply energy while it is in the resonant state with the power receiver 30.

(B) of FIG. 2 shows an operating signal. When the switching circuit 14 is on, the power source 18 is on. (C) of FIG. 2 shows sampling signals detected by the resonant state sensor 16 of FIG. 1 when turned ON to detect (sample) a plurality of signals for the sampling duration. (D) of FIG. 2 shows a received signal inputted to the resonant state sensor 16 of FIG. 1. This signal shows the state of the power feeding coil 11 in the resonant state. Although the signal waveform is schematically shown, they are signals having frequency characteristics, and it is possible to measure the frequency components. Usually, voltage is converted into a digital value by an AD conversion circuit and information is transmitted to the control circuit 17 of FIG. 1.

For the resonance duration shown in (A) of FIG. 2, when energy in the power feeding coil 11 and the resonant condenser 13 is supplied to the power receiver 30, the signal strength (voltage) reduces as shown in (D) of FIG. 2. Simulations may be performed on whether it is resonant well by seeing this change. Additionally, frequency characteristics may be detected as a phase difference. A slight change is found between resonance at which the power feeder 10 resonates with the power receiver 30 and non-resonance. Taking all of this into account, the control circuit 17 tunes the frequency at the power supply in cooperation with the frequency tuning circuit 15. In some cases, a frequency mismatch may be intentionally made to see changes of the state shown (D) of FIG. 2. Additionally, in the resonant state with the power receiver 30, the control circuit 17 adjusts the operating duration considering the way the voltage reduces as shown in (D) of FIG. 2.

Additionally, the detection of the resonant state sensor 16 shown in (C) of FIG. 2 involves an energy loss as the power feeder 10. Accordingly, the detection is not performed every time, and sampling may be performed intermittently, for example, once per second to suppress the energy loss. Additionally, the specifications of the power source 18 or the power feeding coil 11 and the resonant frequency are determined according to the magnitude of energy desired to transmit or the width or height of a target to feed power. The resonant condenser 13 is usually set according to the specification of the resonant frequency used as a reference. Their configuration is, in practice, formed as an enhanced electric circuit configured after repeated complicated simulations. As described above, since the control circuit 18 uses a programmable circuit such as a microcontroller or a programmable logic device, it is possible to find an appropriate program after repeated simulations and control according to the program.

The circuit of the power receiver 30 includes the predetermined power reception coil 31, and includes at least the condenser 33 and the rectifier circuit 34. The power receiver 30 has the internal secondary battery 37 embedded therein. The internal secondary battery 37 is a rechargeable secondary battery. The secondary battery may be replaced with a super condenser (an electrical double layer condenser). The specification or capacity of the power reception coil 31 and the resonant frequency is set according to the magnitude of energy desired to receive, but the capacity desired to receive as the power receiver 30 may be considered firstly when designing.

When electromagnetic induction by a predetermined resonant frequency occurs in the power feeding coil 11 of the power feeder, the magnetic flux is generated such as the magnetic flux lines shown in FIG. 1. In front of the magnetic flux lines, when the power reception coil 31 of the power receiver 30 enters, electrical energy is generated by the electromotive force by electromagnetic induction. The energy is recovered and stored in the internal secondary battery 37. In the case of the existing common wireless power feeding device, in many cases, the power receiver 30 includes a communication means for communication with the power feeder 10 to indicate the state in which the frequency detection circuit and the power receiver 30 are placed. The communication means sends a signal to the power feeder 10, and the power feeder 10 has a structure that tunes an appropriate resonant frequency. In this case, the power receiver 10 needs a predetermined IC circuit.

In contrast, the present disclosure forms the circuit of the power receiver 30 in a very simple structure. Since this simple configuration makes simultaneous charging and discharging possible, it is possible to supply power by charging and discharging to the electronic apparatus at the same time by the wireless power feeding system when a charger is mounted in the corresponding electronic apparatus.

This structure is, in particular, the application of the structure of a stylus pen using electromagnetic induction of U.S. Pat. No. 5,714,194. For example, the stylus pen includes a simple power reception coil and a condenser. In this simple configuration, pen pressure information or switching on/off may be detected by a change in resonant frequency. By the application of this principle, it is possible to determine whether it is normal or abnormal and whether tuning is necessary by checking the state of the resonant frequency.

Figure 3:
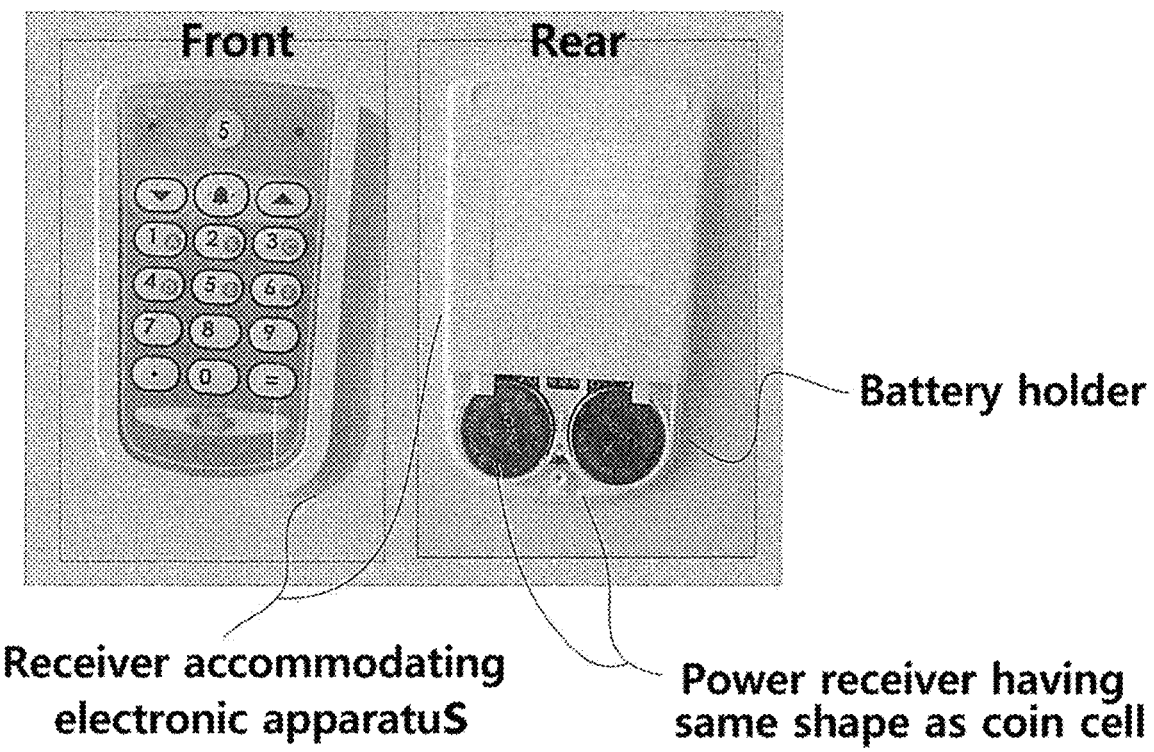
FIG. 3 is a diagram showing a product image of a power receiver.

FIG. 3 shows a product image in an embodiment of the power receiver of the present disclosure. In the present disclosure, the power receiver of FIG. 1 may include a housing having the same shape as a battery or a coin cell and an electrode terminal. FIG. 3 shows an embodiment of the power receiver having the same shape as a coin cell. The power receiver may be mounted in a battery holder of an electronic apparatus using a battery. The embedded secondary battery embedded in the power receiver is charged with the electrical energy received from the power feeder. Accordingly, it is possible to use the electronic apparatus while feeding power without replacing or removing the battery.

Figure 4:
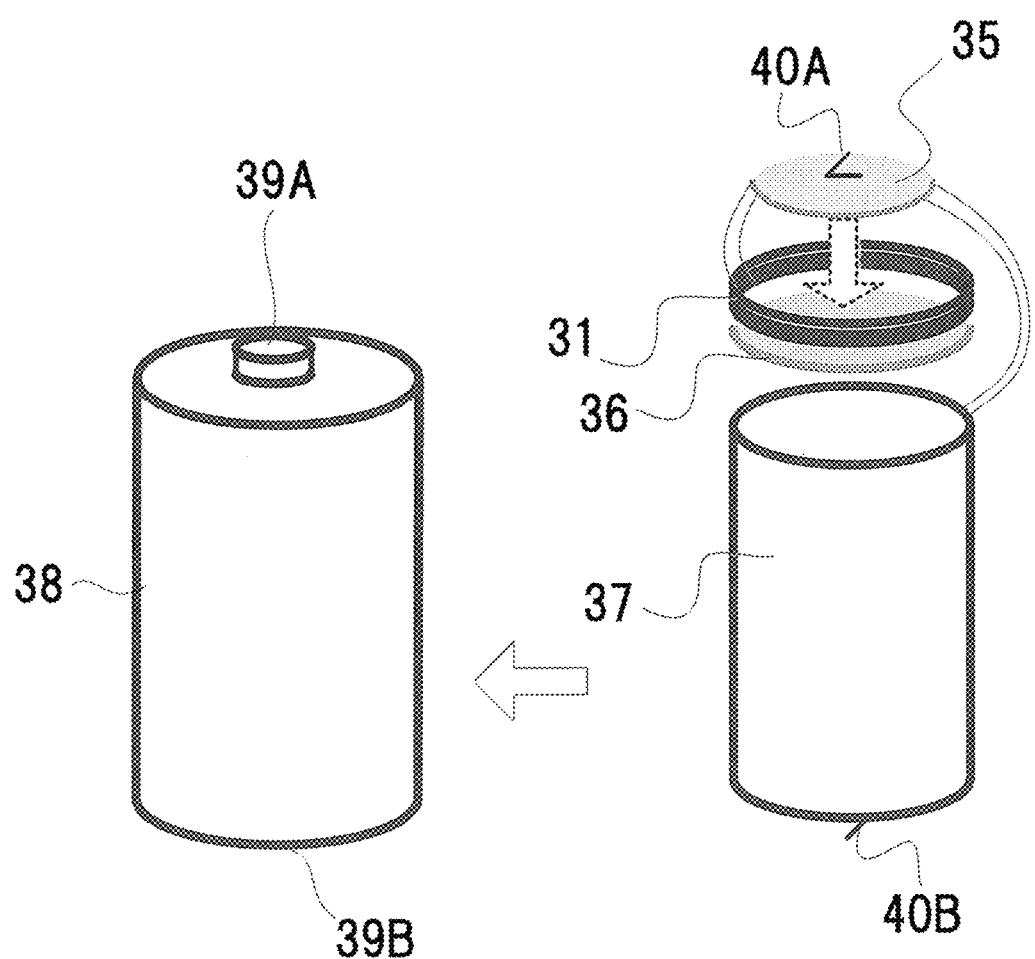
FIG. 4 is a configuration diagram of a battery type power receiver.

FIG. 4 is a configuration diagram of a power receiver having the same shape as a battery as another embodiment of the power receiver of the present disclosure. The power receiver having the same shape as the battery is received in a battery type case having the electrode terminal of the battery. The power reception coil 31, the internal secondary battery 37 and a power receiving circuit board (the condenser, the rectifier circuit, etc.) are received in the battery type case. A shield plate 36 serving as an electromagnetic shield is installed in the power reception coil 31. As shown in FIG. 4, the power receiving circuit board 35 is placed in the gap of the power reception coil 31 to embed in a small receiving volume. While electrode terminals 39A, 39B are installed in a power receiver housing 38 having the same shape as the battery, electrode terminals 40A, 40B are installed in the power receiving circuit board 35. For connection of the electrode terminal 39B and the electrode terminal 40B, instead of wiring connection, the electrode of the internal secondary battery 37 may be used.

Figure 5:
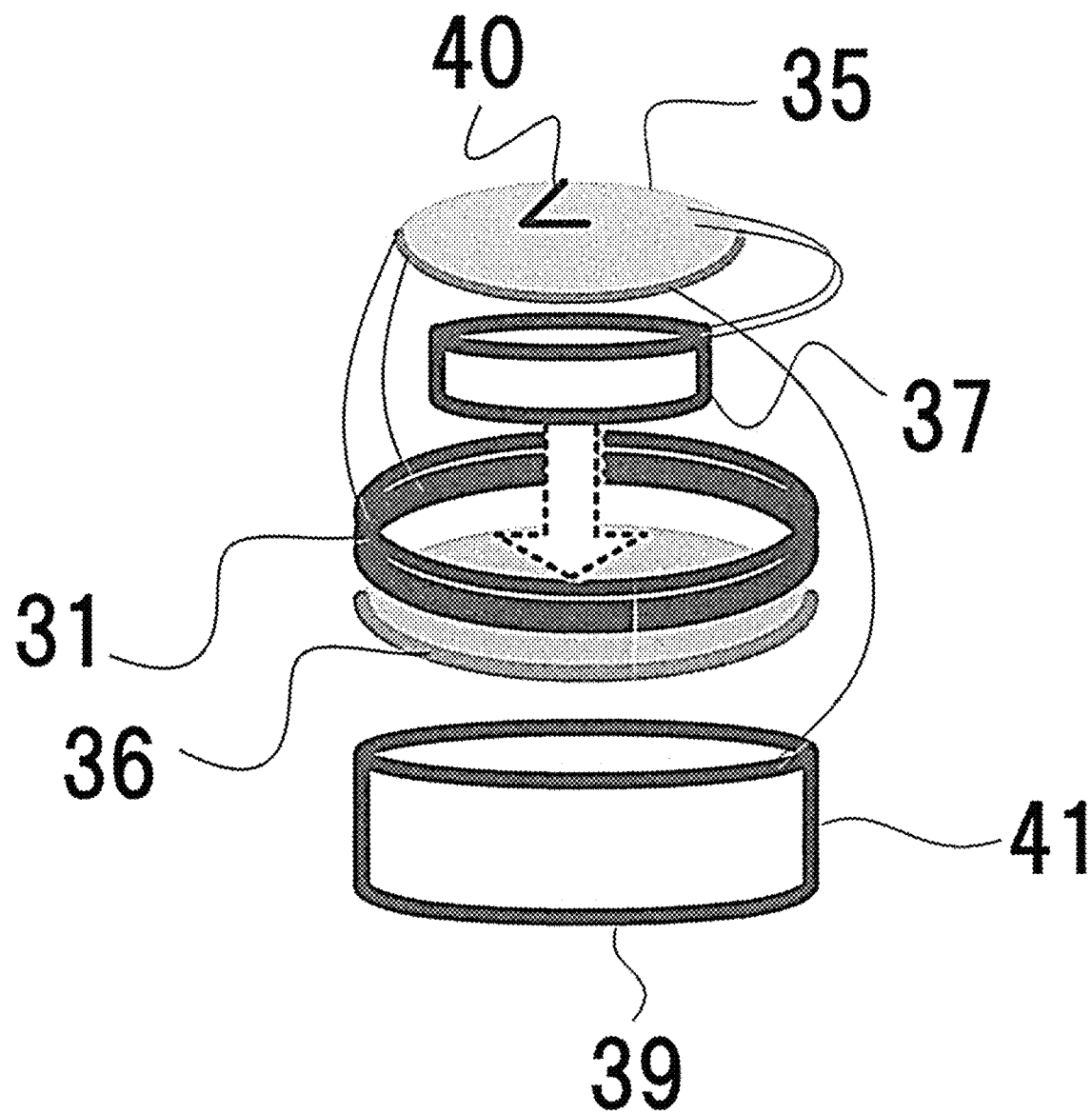
FIG. 5 is a configuration diagram of a button cell type power receiver.

FIG. 5 is a diagram showing the internal configuration of a power receiver having the same shape as a coin cell (a button cell). The power receiver of this embodiment has the same shape as the coin cell, and is received in a power receiver housing 41 having the same shape as the coin cell having the same electrode terminal. The power receiver has the internal secondary battery 37, the shield plate 36, the power reception coil 31 and the power receiving circuit board 35. The shield plate 36 serving as an electromagnetic shield is installed between the power reception coil 31 and the internal secondary battery 37. As shown in FIG. 5, the power receiving circuit board 35 and the internal secondary battery 37 are placed in the gap of the power reception coil to embed in a small receiving volume. When it comes to an electrode terminal 39 of the power receiver housing 41 having the same shape as the coin cell, an electrode terminal 40 is installed in the power receiving circuit board 35. One of the two electrode terminals may use the electrode of the internal secondary battery 37.

Figure 6:
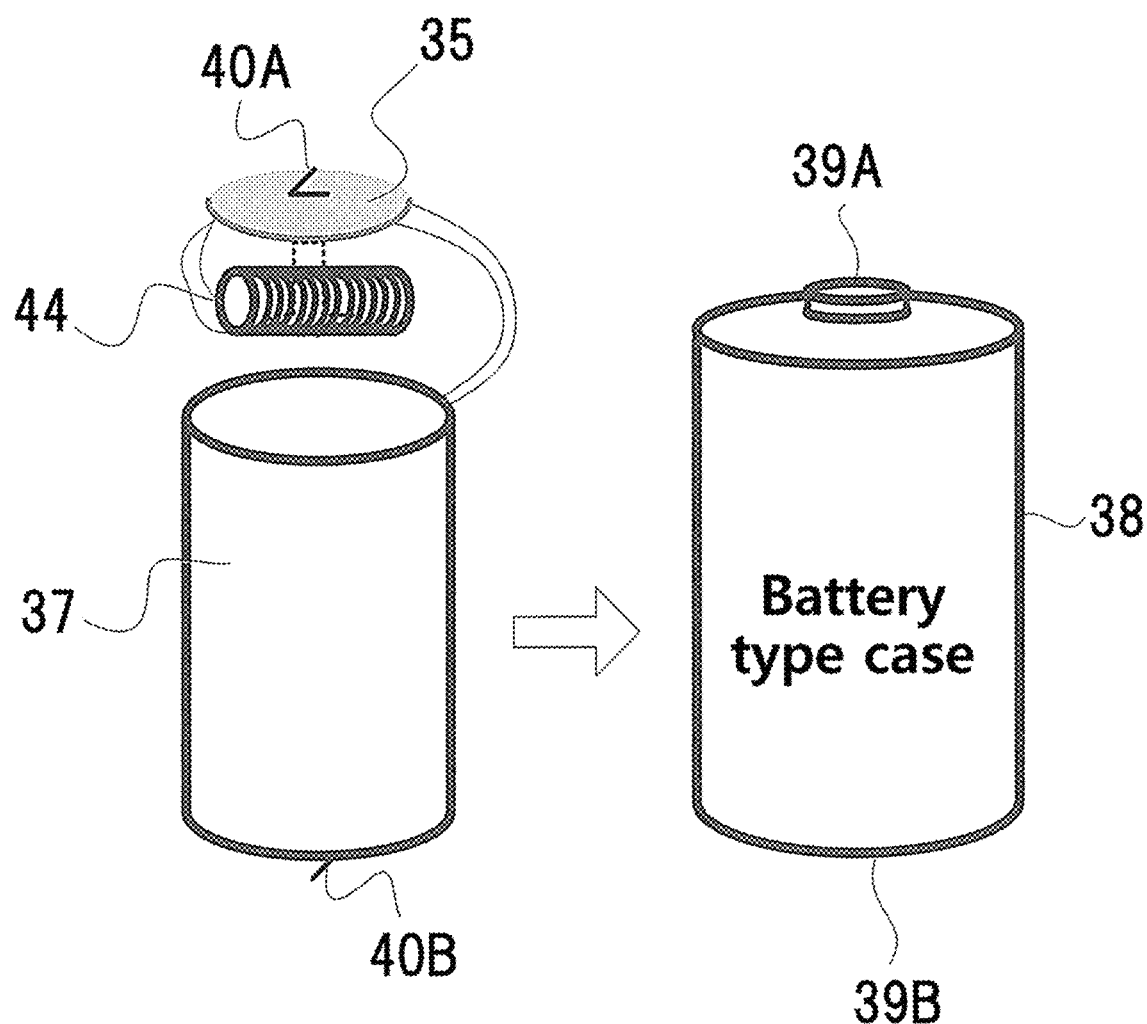
FIG. 6 is a configuration diagram 2 of a battery type power receiver.

FIG. 6 shows an example of using a power reception coil having high orientation in a battery type power receiver (a power receiver having a power receiver housing having the same shape as a battery). A difference from the configuration of FIG. 4 is that the power reception coil 31 is a coil having high orientation (a cylindrical coil, an air core coil, a ferrite coil 44, etc.). Additionally, although omitted in FIG. 6, when the power reception coil having high orientation is used, it needs to face toward the power feeder, and thus a power reception coil support instrument is installed to direct the coil toward an appropriate direction. The coil has a shape such as a cylindrically wound coil, not a shape of a circular ring. This coil may be an air core coil, but a ferrite coil having cylindrical ferrite make characteristics better. The embodiment of FIG. 6 selects a ferrite coil 44. The power receiver is embedded in a battery type case 38 having the electrode terminal of the battery. The power receiver has the internal secondary battery 37, the ferrite coil 44 and the power receiving circuit board 35. When it comes to electrode terminals 39A, 39B of the power receiver housing having the same shape as the battery, wiring connection is established on electrode terminals 40A, 40B of the power receiving circuit board 35 side. For connection of the electrode terminal 39B and the electrode terminal 40B, direct connection may be made in the internal secondary battery 37, and the electrode of the internal secondary battery 37 itself may be exposed to the outside.

Figure 7:
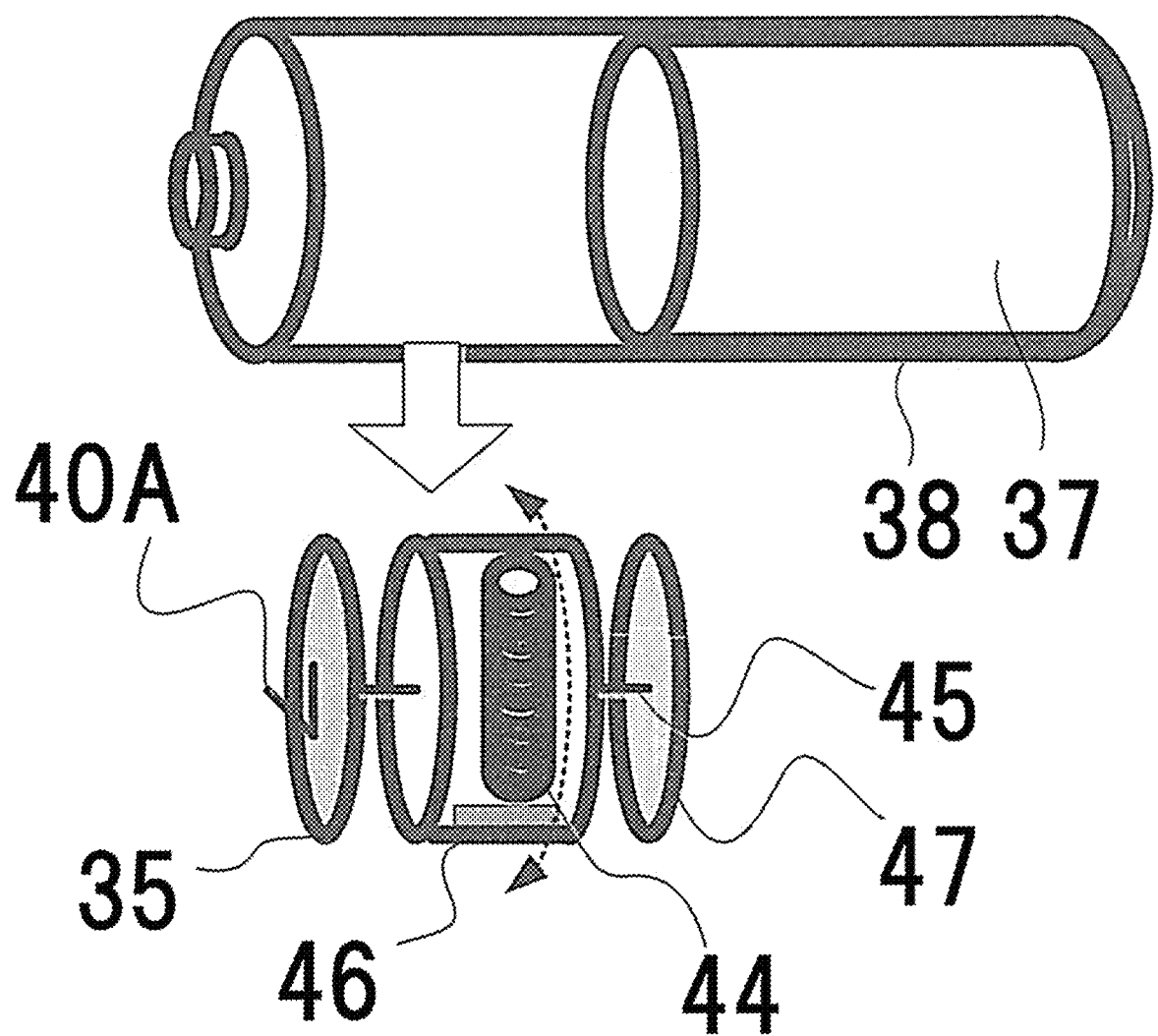
FIG. 7 is a diagram illustrating a method for operating a power receiver unit.

FIG. 7 is a diagram illustrating a support instrument which supports a power reception coil having high orientation. The instrument (the power reception coil support instrument 45) rotates to support the ferrite coil 44 shown in FIG. 7 by the axis of rotation. The ferrite coil 44 is positioned by the axis of rotation between the power receiving circuit board 35 and a fixing plate 47. At the location at which the ferrite coil 44 is fixed, a weight 46 is installed to direct the ferrite coil toward the power feeder. The ferrite coil 44 always faces down along the earth's gravity by the movement of the power reception coil support instrument 45 and the weight 46. Accordingly, when the power receiver is placed on the power feeding base of the power feeder, it matches with the direction in which the ferrite coil 44 is subjected to the magnetic flux by the power feeding coil. Additionally, a connection from the ferrite coil 44 to the power receiving circuit board 35 with an electrical wire should be considered. The axis of rotation of the power reception coil support instrument 45 is preferably rotatable up to 360°.

Figure 8:
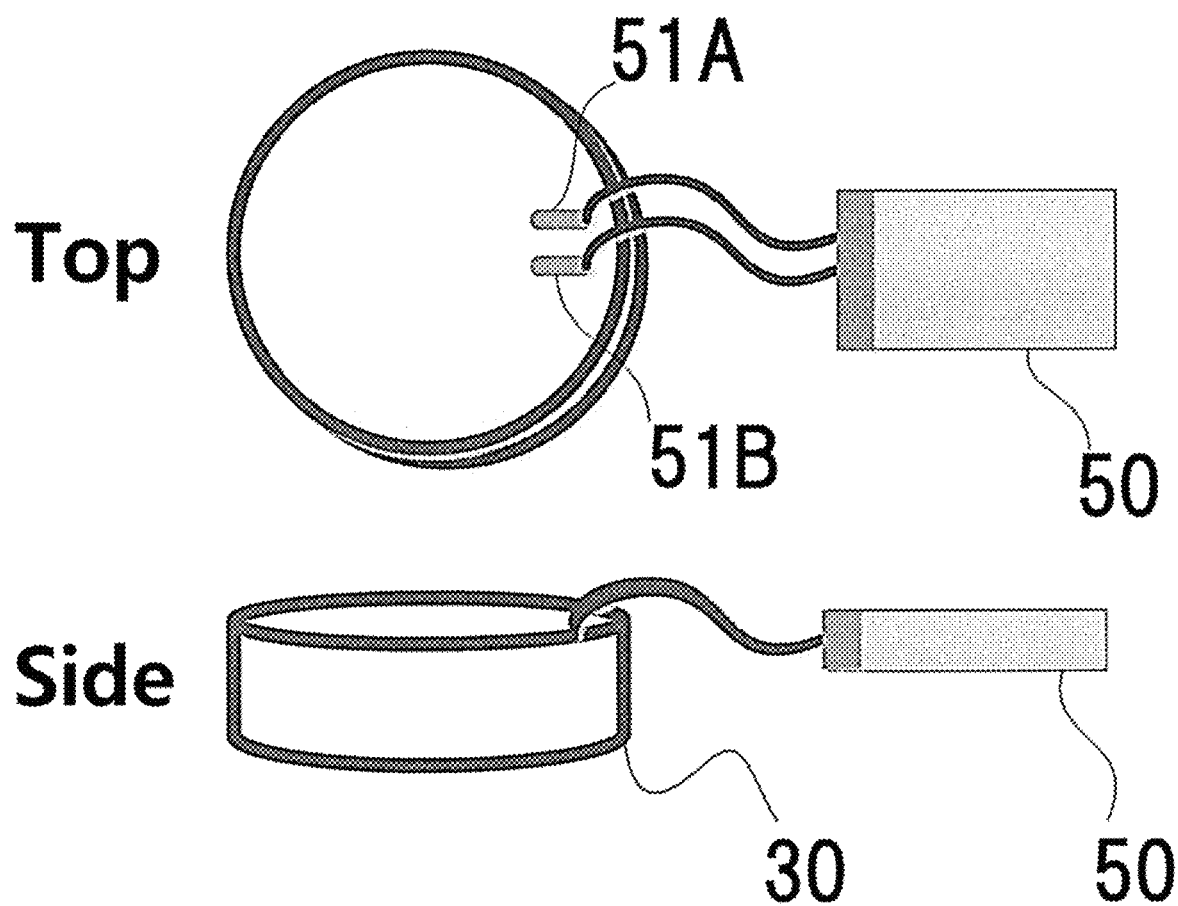
FIG. 8 is a diagram illustrating external secondary battery connection.

FIG. 8 is a connection embodiment of a secondary battery 50 which is an external secondary battery. Here, although the button cell type power receiver 30 is shown, a battery type power receiver may have the same function. When the internal secondary battery embedded in the power receiver 30 is replaced with a super condenser (a super capacitor), it becomes a short-term transient battery. Additionally, fast charging is possible. Additionally, external secondary battery connection terminals 51A, 51B shown in FIG. 8 are installed to mount the external secondary battery 50. Accordingly, for example, even a small capacity type such as a button cell can be used as a large capacity battery. In this instance, the embedded super condenser acts as a stabilizer of the power source. In the case of the configuration shown in FIG. 8, since the button cell holder of the battery accommodating apparatus can be used, only if there is a space for the external secondary battery, it is possible to construct a high capacity secondary battery capable of wireless power feeding without a structural change of the apparatus.

Figure 9:
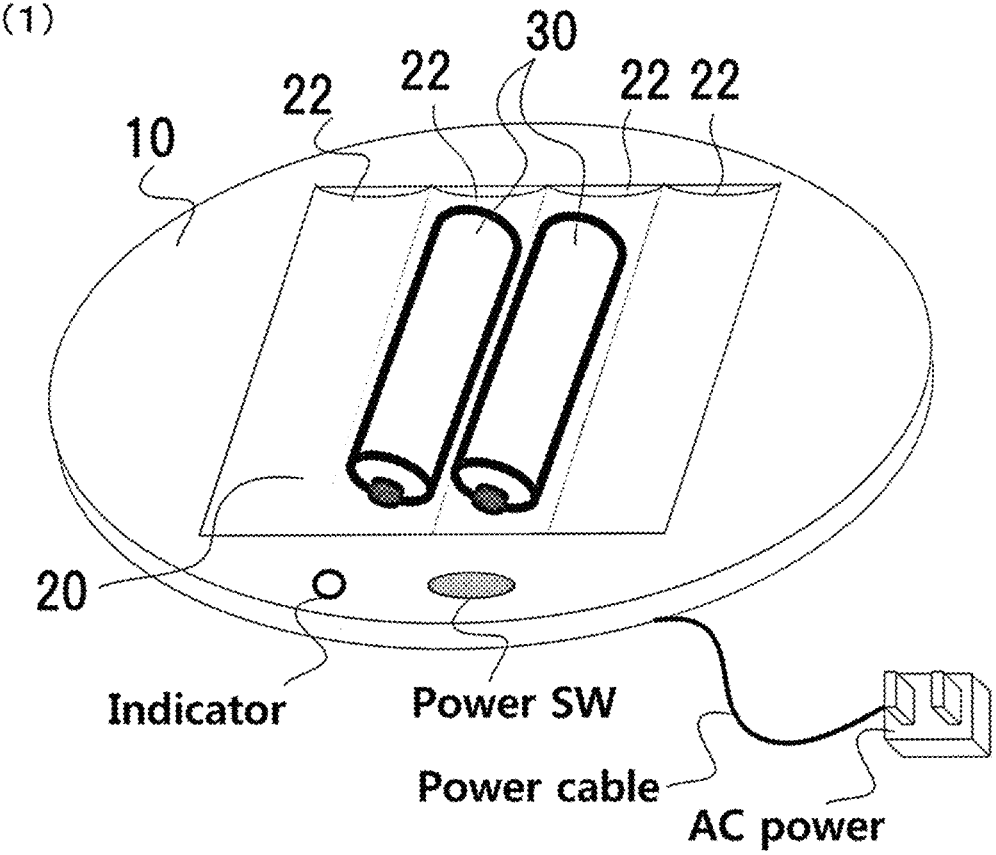
FIG. 9 shows an embodiment of a power feeder for a battery type power receiver.
Figure 9:
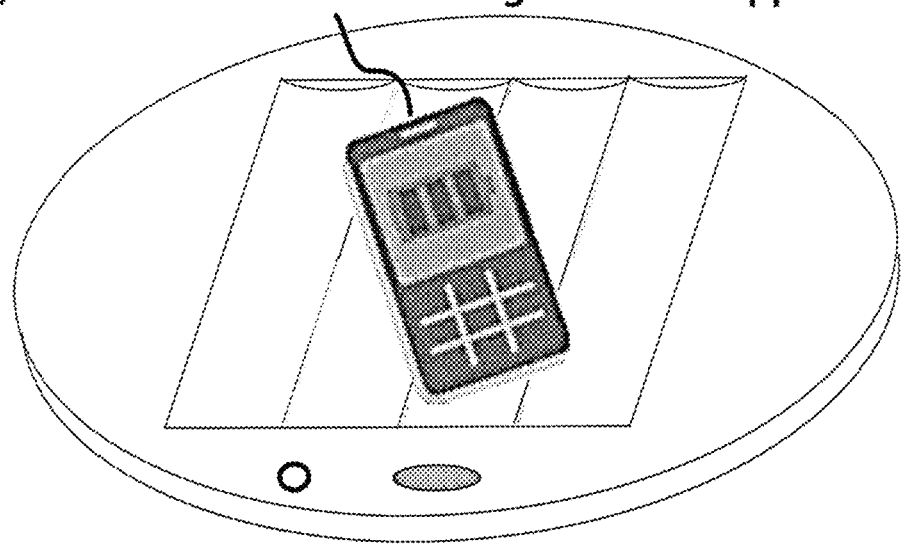

FIG. 9 is an embodiment of a power feeder for a battery type power receiver.

The power feeder shown in (1) of FIG. 9 can wirelessly charge a plurality of battery type power receivers at the same time. FIG. 9 shows the device having 4 grooves 22 to wirelessly charge the maximum of 4 power receivers at the same time. Since the battery is cylindrical and thus rollable, the device may have small grooves 22. The groove 22 may be a curved groove having a larger size than the battery as shown in FIG. 9, and on the contrary, may be a smaller groove than the battery. Preferably, the battery type power receiver can wirelessly feed power when mounted in a power receiver accommodating apparatus. Accordingly, the groove of the power feeder shown in FIG. 9 is configured to allow the power receiver accommodating apparatus to be positioned well. This is shown in (2) of FIG. 9. The power feeder has at least an indicator indicating that it is charging, a power switch, a power cable and an AC power source. The power source may be embedded in the power feeder. Additionally, a USB of a computer may serve as a means for power supply.

Figure 10:
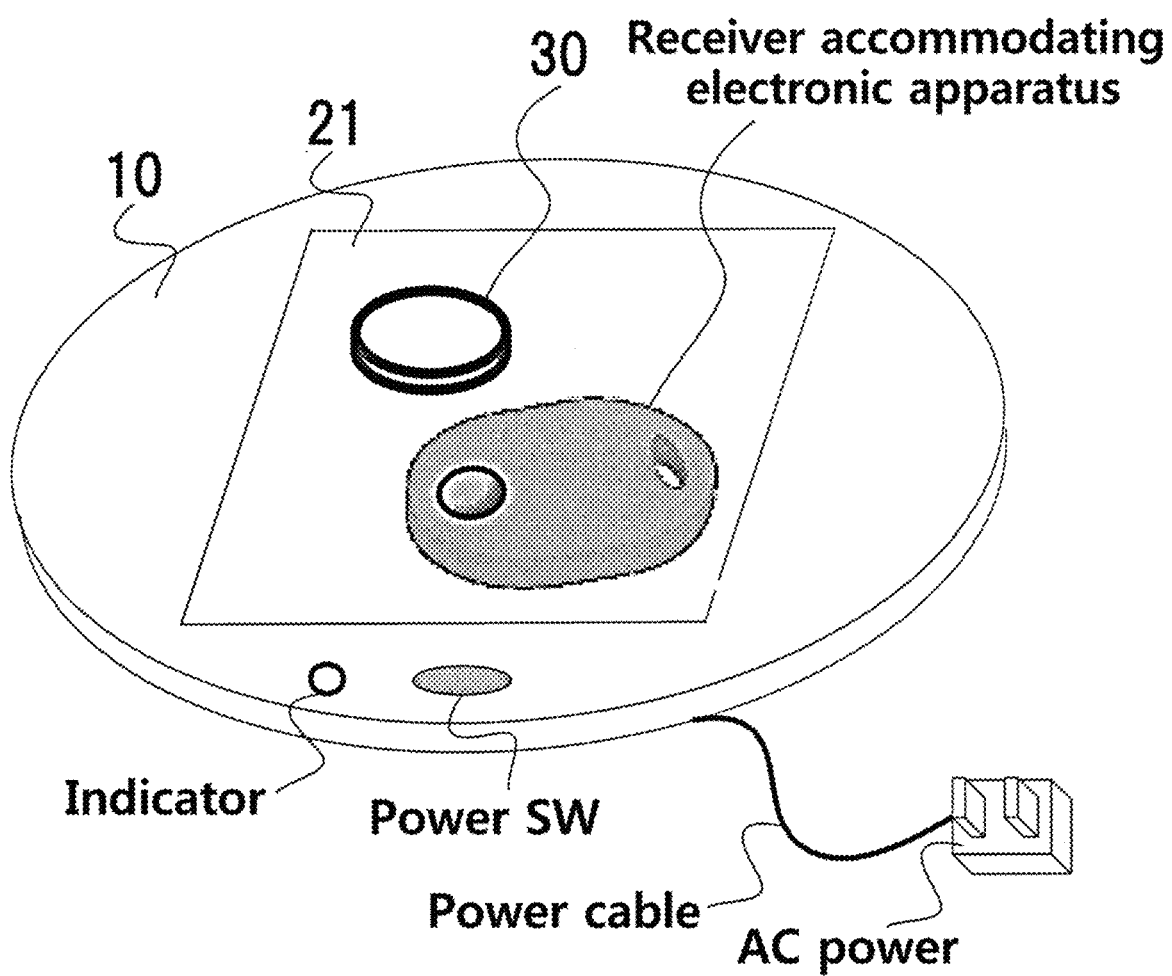
FIG. 10 shows an embodiment of a power feeder for a coin cell type power receiver.

FIG. 10 shows an embodiment of a power feeder for a coin cell type power receiver. The power feeder can wirelessly charge a plurality of battery type power receivers at the same time. FIG. 10 shows the device capable of wirelessly charging 2 power receivers at the same time, and one of them is a power receiver accommodating apparatus. Rubber is attached to indicate the possible power feeding range (available for power feeding) 21 and prevent slips. The power feeder has at least an indicator indicating that it is charging, a power switch, a power cable and an AC power source. In some cases, the power source may be embedded, or a USB may serve as a means for power supply.

Figure 12:
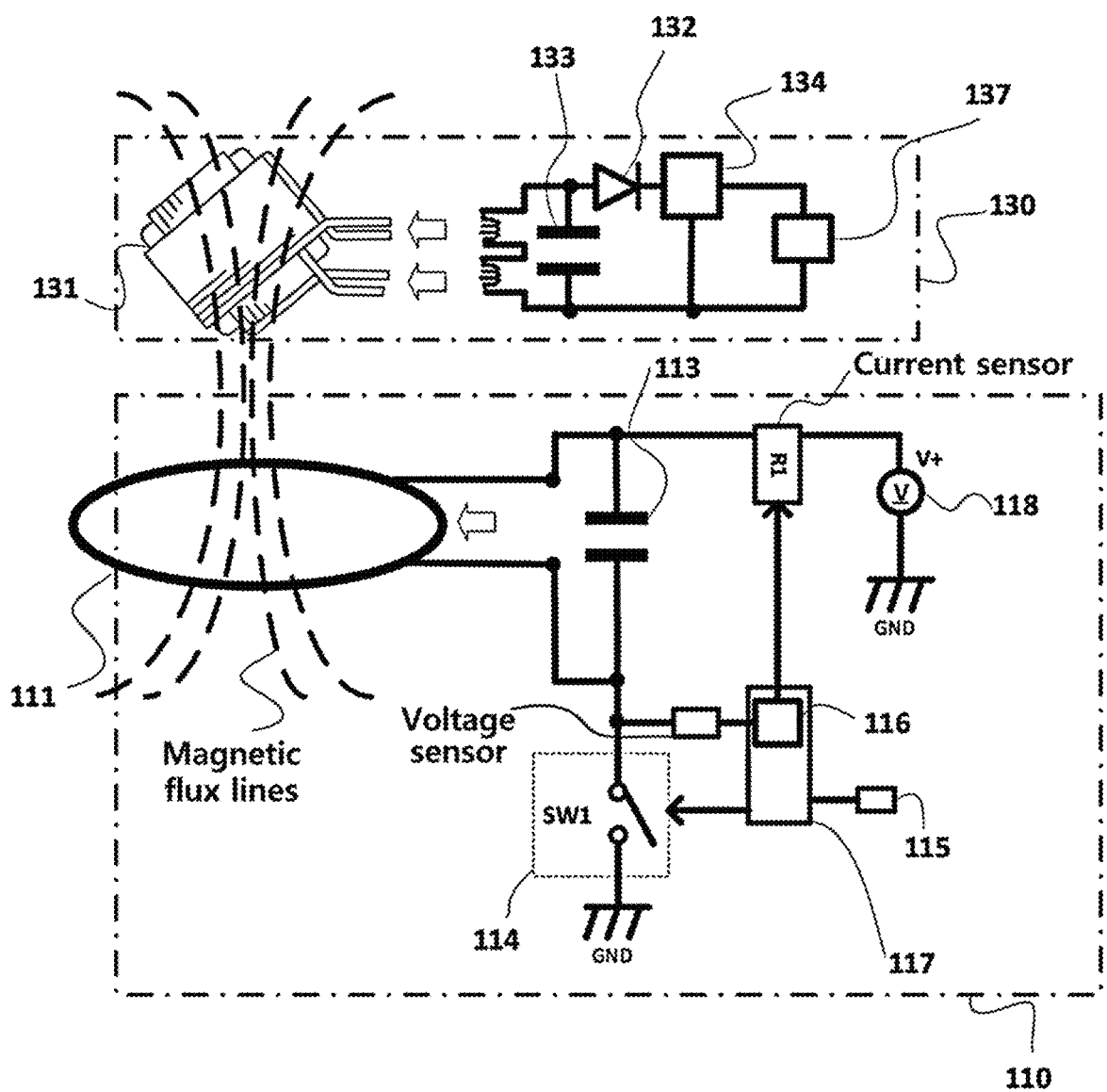
FIG. 12 is a basic circuit configuration diagram of a second invention.

Hereinafter, a preferred embodiment for realizing a system of a second invention will be described in detail with reference to the accompanying drawings. FIG. 12 is a basic circuit configuration diagram of a wireless power feeding system according to the present disclosure. The wireless power feeding system according to the present disclosure includes a combination of a power feeder 110 and a power receiver 130. Electrical energy is supplied from the power feeder 110 to the power receiver 130.

As shown in FIG. 12, the power receiver 130 includes a power reception coil 131, a condenser 133, a diode 132, a rectifier circuit 134 and an internal secondary battery 137. There are several features of the power receiver 130 side. First, the internal secondary battery 137 may be mounted in the power receiver 130. Second, the power reception coil 131 installed in the power receiver 130 may be significantly different from the size, material or electrical specification of a power feeding coil 111 of the power feeder 110. In particular, the shape of the power reception coil 131 is characteristic, and has a coil shape capable of receiving power in any direction. Third, the power receiver 130 is received in the existing battery or button cell type case, and generates the equivalent electrical output to the battery and thus serves as a substitute for the battery.

The power feeder 110 includes the power feeding coil 111, a resonant condenser 113 that forms a resonant circuit with the power feeding coil 111, a switching circuit 114 to power on/off the power feeding coil 111, a frequency tuning circuit 115 (for example, a circuit including a PLL circuit) to tune the frequency supplied to the power feeding coil 111, a resonant state sensor 116 to detect the resonant state and a power source 118. The features of the power feeder 110 are as follows. First, the power feeding coil 111 and the resonant condenser 113 form a parallel resonant circuit. Second, there is one switch of FIG. 17 (two switches in the conventional art shown in FIG. 11). Third, the frequency and the power supply time are controlled by controlling the frequency tuning circuit 115 and the switching circuit 114 by a control circuit 117. Fourth, the resonant state sensor 116 detects the resonant state (mostly, a frequency difference), and in addition to the control, the control circuit 17 controls to stop the power feeding based on the detection results of the resonant state sensor 116.

FIG. 12 is a basic circuit diagram (close to a block diagram). The basic circuit includes the power feeding coil 111, and generates electromagnetic waves to cause electromagnetic induction. The electric circuit of the power feeder 110 includes at least the resonant condenser 113 and the power source 118, and forms a resonant relationship by a predetermined frequency with the power reception coil 131 of the power receiver 130. The frequency at this time is referred to as resonant frequency, and in general, frequencies from 100 kHz to 500 kHz are used. The resonant frequency used in the present disclosure is not particularly limited.

In the positional relationship or the state of the power receiver 130, there is a slight difference in the resonant frequency. For example, in the position or tilt of the power reception coil 131 of the power receiver 130, the situation gradually changes. Thus, when the power reception coil 131 enters the range in which electromagnetic waves emitted from the power feeding coil 111 reach (within the magnetic flux lines shown in FIG. 12), it is possible to supply energy. The power reception coil 131 entering the magnetic flux lines affects the power feeder in the form of a resonant frequency difference. When there is the resonant frequency mismatch, the efficiency of energy supply reduces. The resonant state sensor 116 (for example, a circuit including a phase detection circuit) detects the frequency or phase mismatch, and the frequency tuning circuit 115 tunes the frequency of the power feeding coil 111 according to the frequency or phase. The frequency tuning circuit 115 may be, for example, a circuit in which a PLL circuit is embedded.

It is necessary to add several factors to the frequency (or phase) tuning. Accordingly, it is preferred to install the control circuit 117 that controls according to a program using a microcontroller (an integrated circuit including a processor, a memory and a peripheral circuit) or a programmable logic device (an integrated circuit capable of defining and changing an internal logic circuit). The control circuit 117 is connected to the resonant state sensor 116 (the phase detection circuit). The resonant state sensor 116 detects a difference in frequency or phase and transmits its signal to the control circuit 117. Accordingly, when a predetermined object other than the power receiver 130 approaches, the resonant state sensor 116 detects an abnormal frequency or phase and transmits its signal to the control circuit 117, to enable the control circuit 117 to stop the power feeding.

The present disclosure is characterized in that the circuit of the power feeder 110 shown in FIG. 12 employs a parallel resonant circuit. Additionally, in the conventional art example shown in FIG. 11, resonance at the power feeding coil is periodically stopped using two switches, a switch 1 and a switch 2 to detect a frequency difference. In contrast, the circuit of FIG. 12 uses a method of detecting the resonant state without stopping the power feeding to the power feeding coil 111.

The wireless power feeding system of the present disclosure includes the basic circuit shown in FIG. 12. The resonant condenser 113 of the power feeder 110 is connected in parallel to the power feeding coil 111. The circuit including the resonant condenser 113 is commonly referred to as a parallel resonant circuit. Meanwhile, the frequently used wireless power feeding system forms a series resonant circuit, and the resonant condenser is placed in series to the coil. In the case of the parallel resonant circuit, when SW1 is turned on, leading to a stable resonant state, and then SW1 is turned off, the power feeder 110 continues the resonant state with the power receiver 130 during the radiation of energy stored in the power reception coil 131 and the condenser 133. Here, based on the resonant state shift detected by the resonant state sensor 116 connected in parallel to the power feeding coil 111, the frequency tuning circuit (the PLL circuit) 115 and the control circuit 117 achieve power supply of suitable frequency. The resonant state sensor 116 is a sensor which detects the resonant state, and detects voltage and current shifts and the phase of the resonant frequency.

It is difficult to clearly detect a phase difference in the resonant frequency of the power receiver 130 shown in FIG. 12. However, it is possible to process simple determinations as to whether to increase or decrease the resonant frequency or maintain the resonant frequency by simulations on many situations obtained by the resonant state sensor 16 and programming based on the simulations. Furthermore, it is possible to control through trials and errors by detecting changes of results after the tuning and determining whether it is suitable or not.

The power reception coil 131 of FIG. 12 is a ferrite coil featuring double windings on one ferrite in two directions. In the circuit diagram, two coils are connected in series. Here, the diode 132 is installed to prevent backfeeding.

Figure 13:
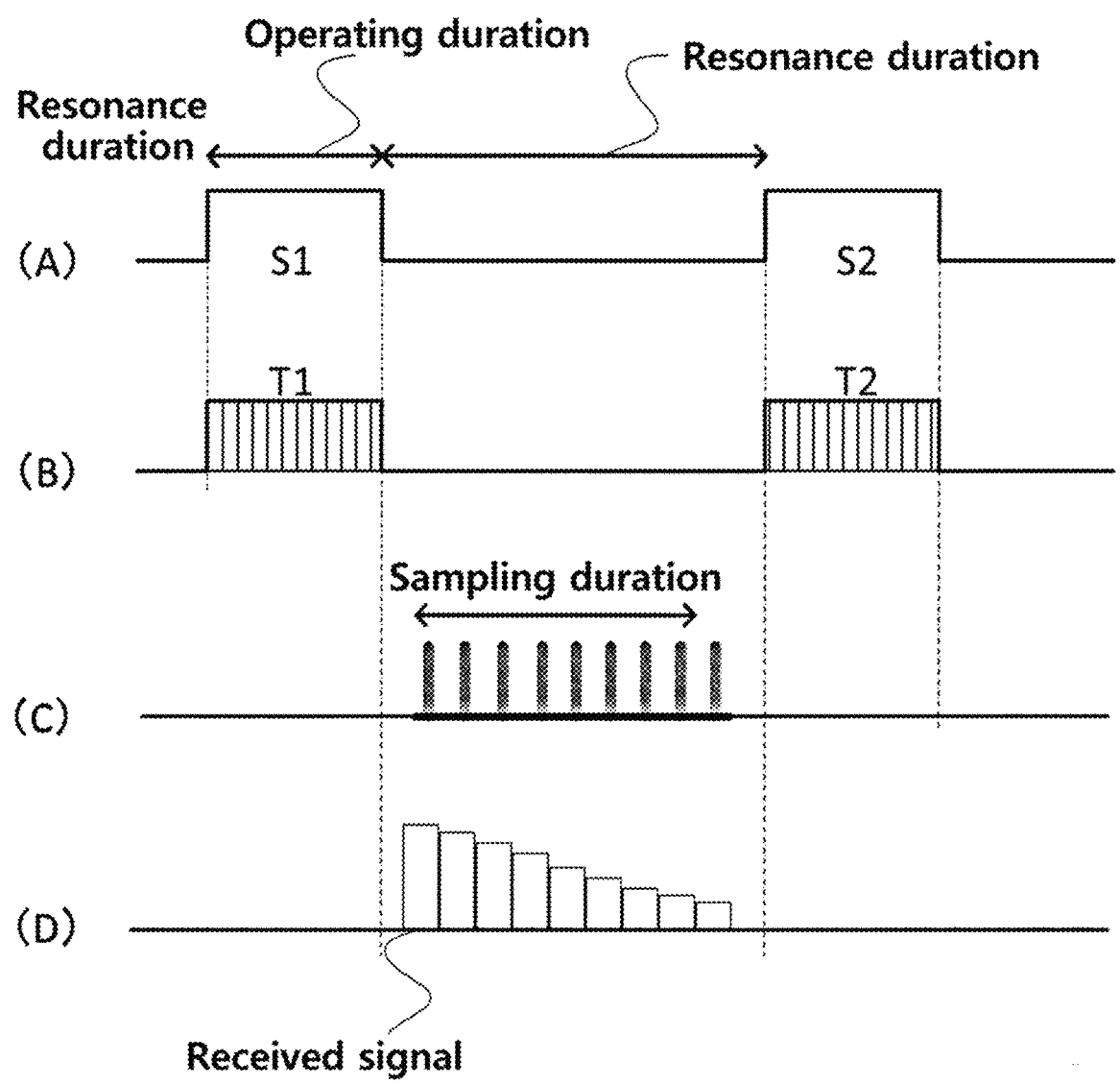
FIG. 13 is a timing diagram of a basic circuit of a second invention.

FIG. 13 is a schematic signal waveform diagram of the basic circuit of the power feeder 110 shown in FIG. 12. (A) of FIG. 13 shows the waveform of the switching circuit 114 shown in FIG. 12 when switched on at high. In brief, when switched on, the power source 118 is supplied, leading to an operating state, i.e., the operating duration. The switched off and non-operating duration leads to a resonant state, i.e., the resonance duration. As shown in FIG. 12, when the power feeding coil 111 and the resonant condenser 113 form the parallel resonant circuit, no matter when it is in the operating state or the resonant state, the power feeder 110 continues to supply energy while it is in the resonant state with the power receiver 130.

(B) of FIG. 13 shows an operating signal. When the switching circuit 114 is on, the power source 118 is on. (C) of FIG. 13 shows sampling signals detected by the resonant state sensor 116 of FIG. 12 when turned ON to detect (sample) a plurality of signals for the sampling duration. (D) of FIG. 13 shows a received signal inputted to the resonant state sensor 116 of FIG. 12. This signal shows the state of the power feeding coil 111 in the resonant state. Although the signal waveform is schematically shown, they are signals having frequency characteristics, and it is possible to measure the frequency components. Usually, voltage is converted into a digital value by an AD conversion circuit and information is transmitted to the control circuit 117 of FIG. 12.

For the resonance duration shown in (A) of FIG. 13, when energy in the power feeding coil 111 and the resonant condenser 113 is supplied to the power receiver 130, the signal strength (voltage) reduces as shown in (D) of FIG. 13. Simulations may be performed on whether it is resonant well by seeing this change. Additionally, frequency characteristics may be detected as a phase difference. A slight change is found between resonance at which the power feeder 110 resonates with the power receiver 130 and non-resonance. Taking all of this into account, the control circuit 117 tunes the frequency at the power supply in cooperation with the frequency tuning circuit 115. In some cases, a frequency mismatch may be intentionally made to see changes of the state shown in (D) of FIG. 13. Additionally, in the resonant state with the power receiver 130, the control circuit 117 adjusts the operating duration considering the way the voltage reduces as shown in (D) of FIG. 13.

Additionally, the detection of the resonant state sensor 116 shown in (C) of FIG. 13 involves an energy loss as the power feeder 110. Accordingly, the detection is not performed every time, and sampling may be performed intermittently, for example, once per second to suppress the energy loss.

Additionally, the specifications of the power source 118 or the power feeding coil 111 and the resonant frequency are determined according to the magnitude of energy desired to transmit or the width or height of a target to feed power. The resonant condenser 113 is usually set according to the specification of the resonant frequency used as a reference. Their configuration is, in practice, formed as an enhanced electric circuit configured after repeated complicated simulations. As described above, the control circuit 118 uses a programmable circuit such as a microcontroller or a programmable logic device, and it is possible to find an appropriate program after repeated simulations and control according to the program.

The circuit of the power receiver 130 has the predetermined power reception coil 131, and has at least the diode 132, the condenser 133 and the rectifier circuit 134. The power receiver 130 has the internal secondary battery 137 embedded therein. The internal secondary battery 137 is a rechargeable secondary battery. The secondary battery may be replaced with a super condenser (an electrical double layer condenser). In this instance, the specification or capacity of the power reception coil 131 and the resonant frequency is set according to the magnitude of energy desired to receive, but first of all, it is possible to design the capacity desired to receive as the power receiver 130. Additionally, the power reception coil of the present disclosure capable of receiving power in any direction is a special ferrite coil having windings on one ferrite in two or three directions. Accordingly, the electromotive force by the electromagnetic induction is generated in the coil according to the winding direction in any direction of the magnetic flux.

When electromagnetic induction by a predetermined resonant frequency occurs in the power feeding coil 111 of the power feeder 110, the magnetic flux is generated such as the magnetic flux lines shown in FIG. 12. When the power reception coil 131 of the power receiver 130 enters the end of the magnetic flux lines, electrical energy is generated by the electromotive force by electromagnetic induction. The energy is recovered and stored in the internal secondary battery 137. In the case of the existing common wireless power feeding device, in many cases, the power receiver 130 includes a communication means for communication with the power feeder 110 to indicate the state in which the frequency detection circuit and the power receiver 130 are placed. The communication means sends a signal to the power feeder 110, and the power feeder 110 has a structure that tunes an appropriate resonant frequency. In this case, the power receiver 110 needs a predetermined IC circuit.

In contrast, the present disclosure forms the circuit of the power receiver 130 in a very simple structure. Since this simple configuration makes simultaneous charging and discharging possible, it is possible to supply power by charging and discharging to the electronic apparatus at the same time by the wireless power feeding system when a charger is mounted in the electronic apparatus.

Additionally, the power reception coil of the present disclosure capable of receiving power in any direction is a special ferrite coil having windings on one ferrite in two or three directions. Accordingly, the electromotive force by the electromagnetic induction is generated in the coil according to the winding direction in any direction of the magnetic flux.

Figure 15:
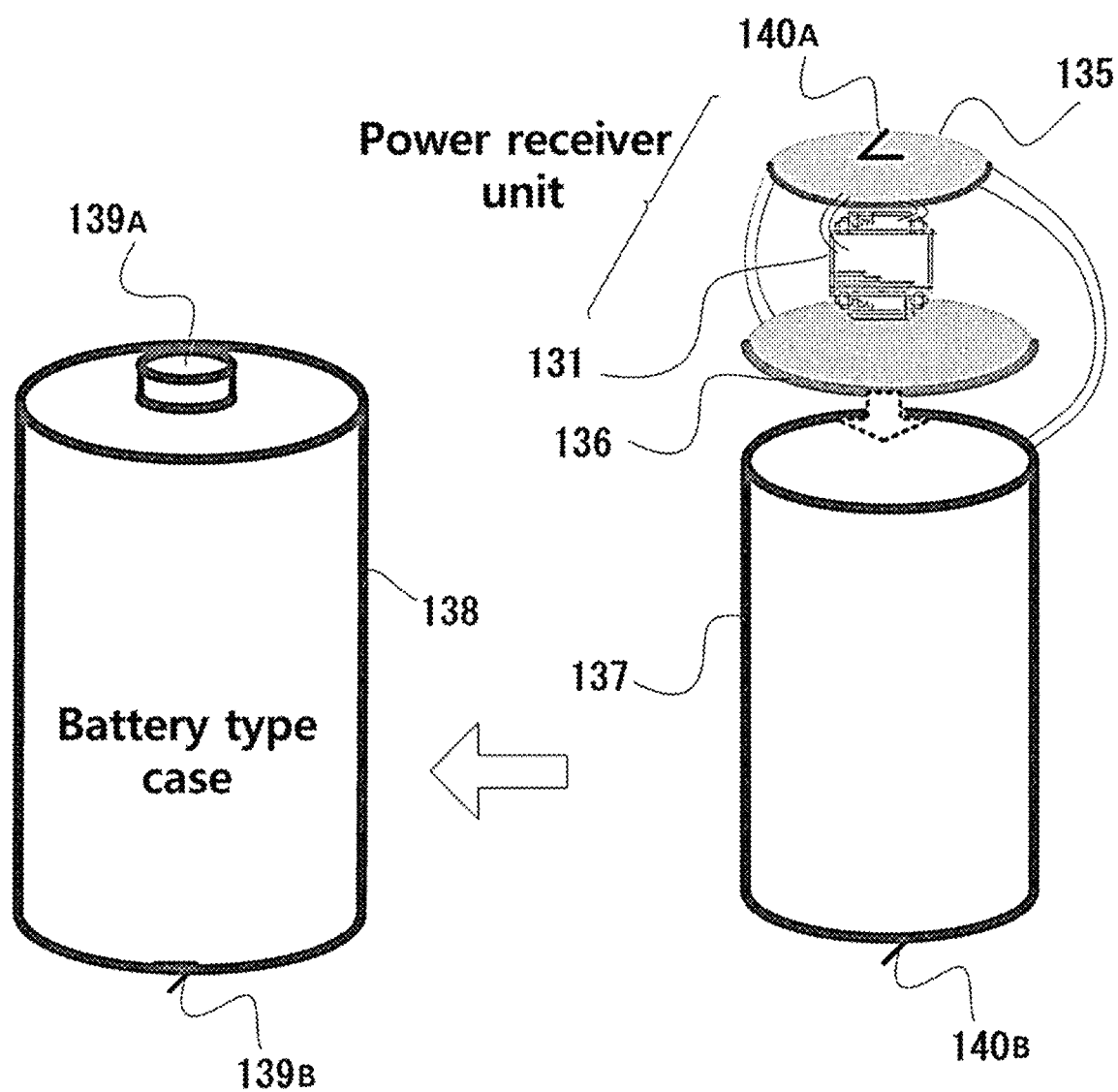
FIG. 15 is a configuration diagram of a battery type power receiver of a second invention.

FIG. 15 is a configuration diagram of a power receiver having the same shape as a battery as another embodiment of the power receiver of the present disclosure. The power receiver having the same shape as the battery is received in a battery type case having the electrode terminal of the battery. The power reception coil 131, the internal secondary battery 137 and a power receiving circuit board (the condenser, the rectifier circuit, etc.) are received in the battery type case. A shield plate 136 serving as an electromagnetic shield is installed in the power reception coil 131. As shown in FIG. 15, the power receiving circuit board 135 is placed in the gap of the power reception coil 131 to embed in a small receiving volume. While electrode terminals 139A, 139B are installed in a power receiver housing 138 having the same shape as the battery, electrode terminals 140A, 140B are installed in the power receiving circuit board 135. For connection of the electrode terminal 139B and the electrode terminal 140B, instead of wiring connection, the electrode of the internal secondary battery 137 may be used.

Figure 16:
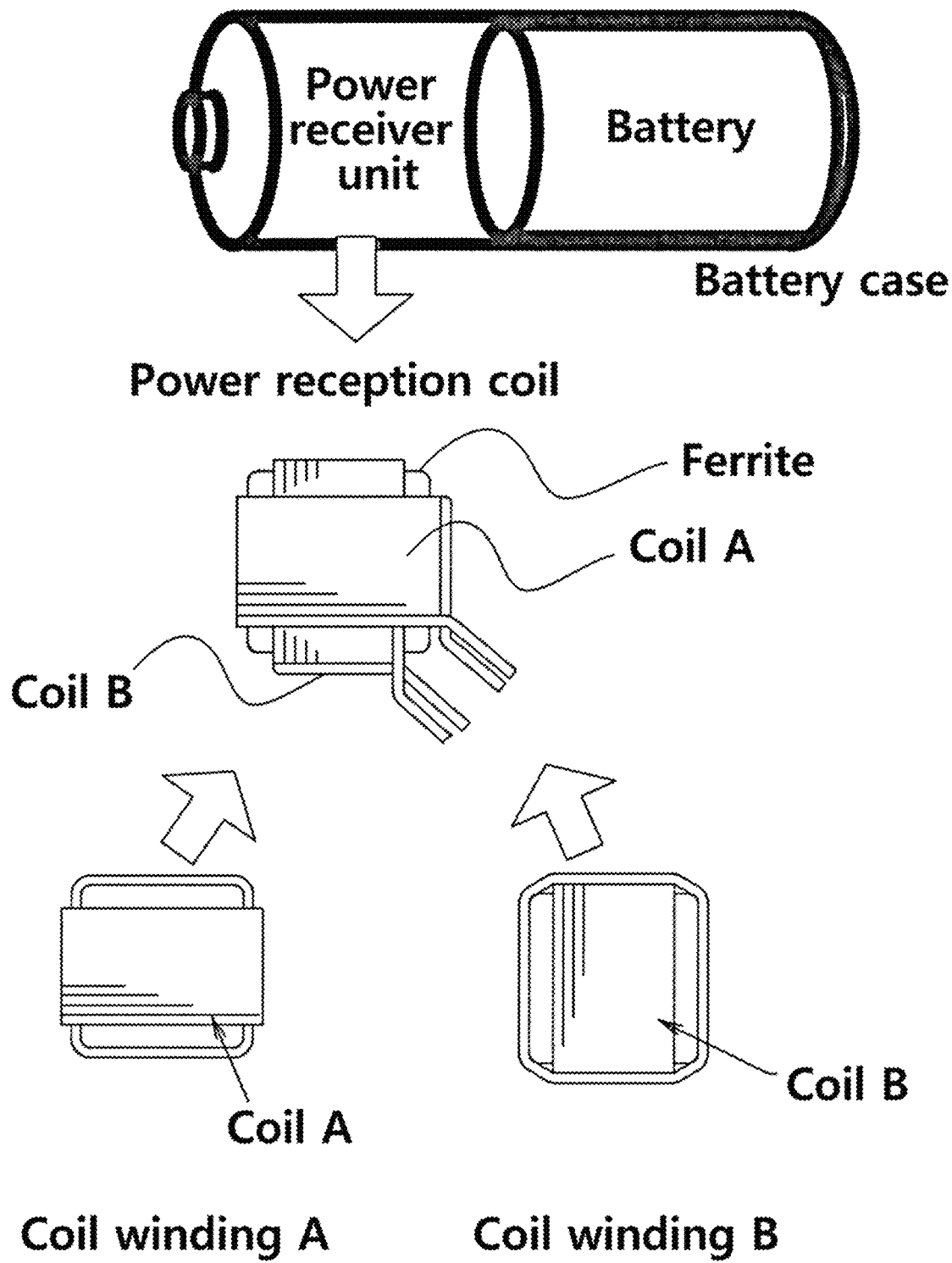
FIG. 16 is a diagram illustrating a ferrite coil of a power receiver unit of a second invention.

FIG. 16 shows an example of using a power reception coil capable of receiving power in any direction in a battery type power receiver (a power receiver having a power receiver housing having the same shape as a battery). The power reception coil 131 is configured to receive power in any direction. In the case of a power reception coil having high orientation, it is necessary to match the direction to the magnetic flux direction of the power feeder, but this problem can be solved when the power reception coil is a ferrite coil having low orientation, i.e., capable of receiving power in any direction. Since the battery has a cylindrical shape, when rotating around the cylinder, in the case of a common ferrite coil shape, high orientation is problematic. However, according to the present disclosure, it is possible to receive power equally in any rotation.

The ferrite coil includes at least a coil A and a coil B wound on one ferrite such that the coil winding A and the coil winding B cross each other in the perpendicular direction. Although two types of windings are shown, due to the cylinder such as the battery, three types of windings on one ferrite are possible. In this case, it can be used in a spherical power receiving device, not cylindrical, and it is possible to respond to 360° rotation in any rotation direction.

Figure 17:
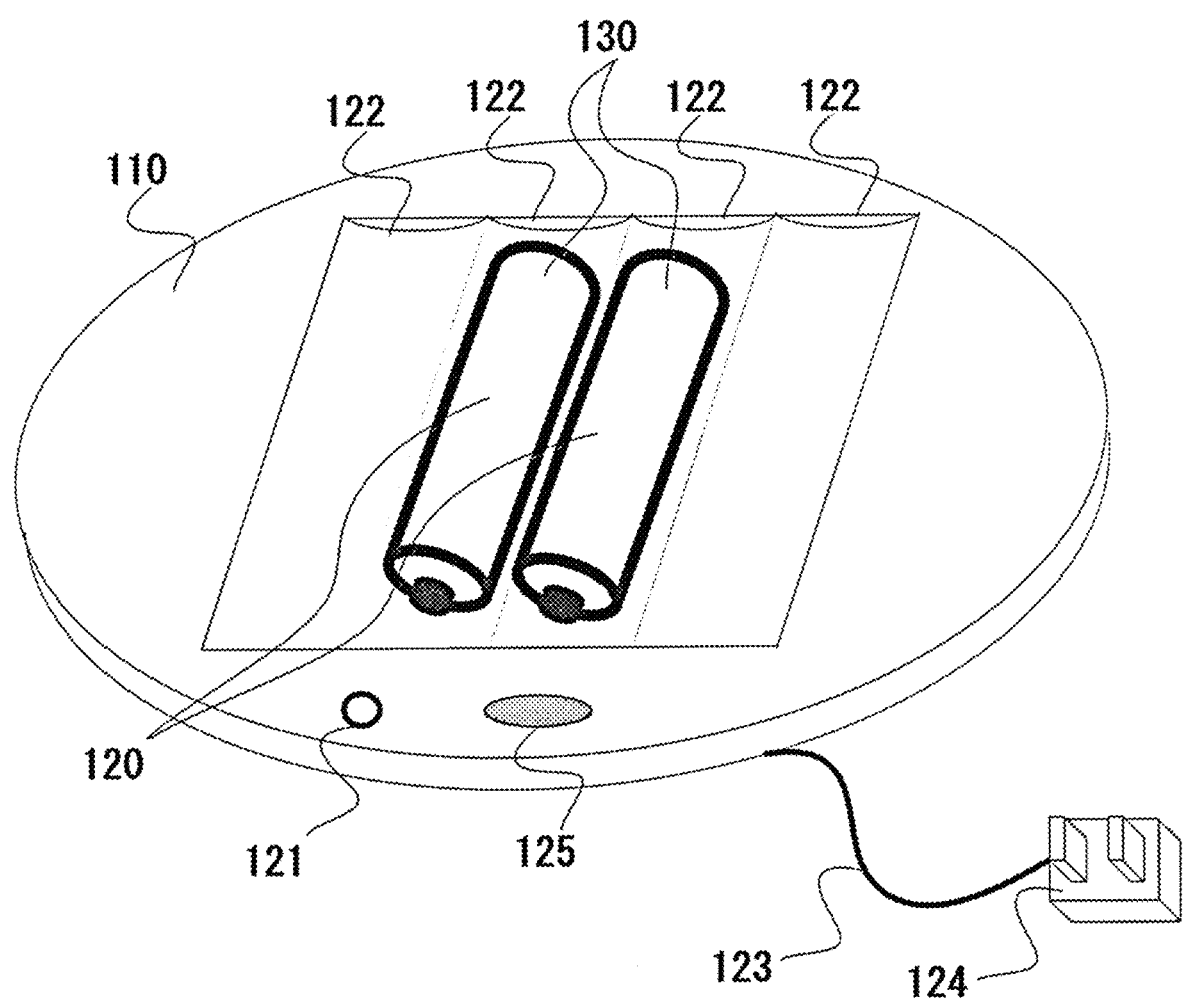
FIG. 17 shows an embodiment of a power feeder for a battery type power receiver of a second invention.

FIG. 17 is an embodiment of a power feeder for a battery type power receiver. The power feeder shown in (1) of FIG. 17 can wirelessly charge a plurality of battery type power receivers at the same time. FIG. 17 shows the device having 4 grooves 122 to wirelessly charge the maximum of 4 power receivers at the same time. Since the battery is cylindrical and thus rollable, the device may have small grooves 122. The groove 122 may be a curved groove having a larger size than the battery shown in FIG. 17, and on the contrary, may be a smaller groove than the battery.

Figure 14:
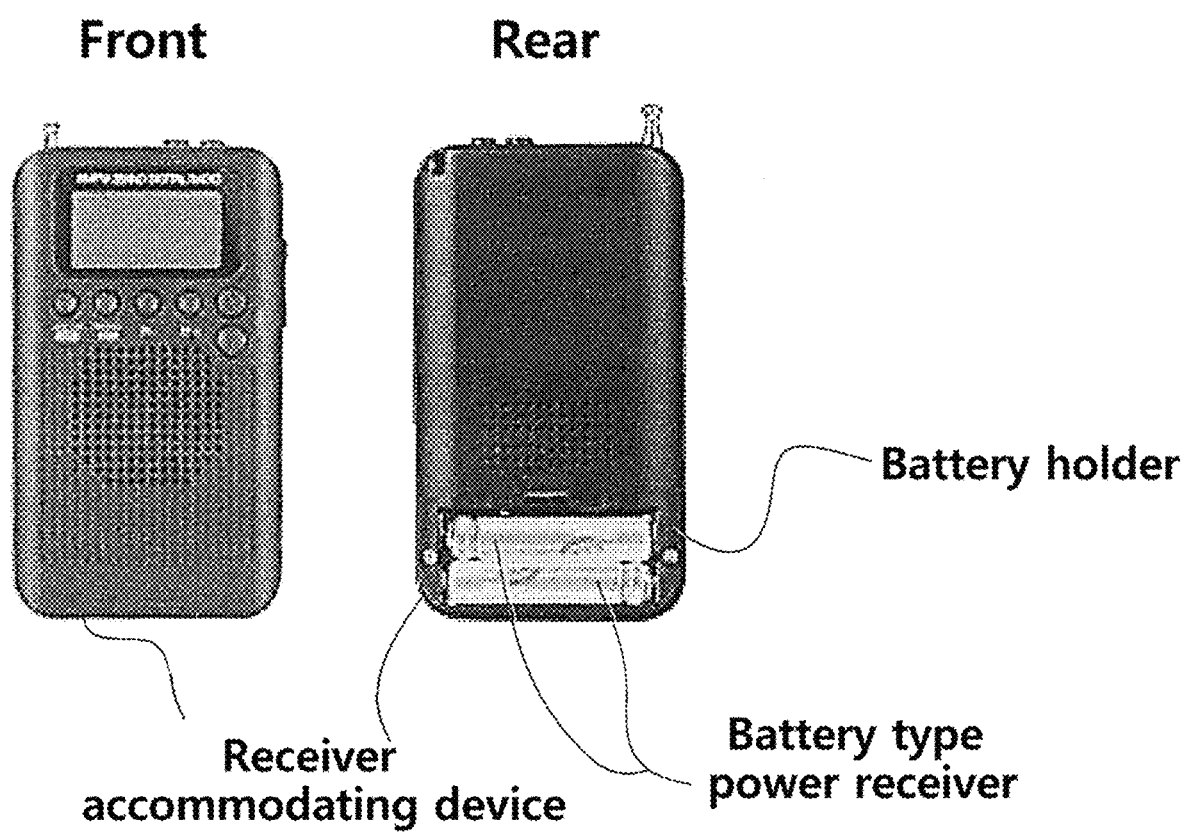
FIG. 14 is a diagram showing an image of an apparatus in which a power receiving device of a second invention is embedded.

Preferably, the battery type power receiver can achieve wireless power feeding when mounted in a power receiver accommodating apparatus. For example, as shown in the image of the power receiver accommodating apparatus of FIG. 14, a battery holder is provided on the rear surface of the device, where two battery type power receiving devices are received, and in this state, since the groove 122 is configured to allow the power feeder 130 for the battery type power receiver of FIG. 17 to be positioned well, it is possible to charge the secondary battery of the power receiving device without concerns. The power feeder has at least an indicator indicating that it is charging, a power switch, a power cable and an AC power source. The power source may be embedded in the power feeder. Additionally, a USB of a computer may serve as a means for power supply.

INDUSTRIAL APPLICABILITY

According to the wireless power feeding system of the present disclosure, in a device using a battery that needs to be replaced when it drains, using the product of the present disclosure, it is possible to provide a battery that is substituted with a wireless chargeable device. In the case of a battery, when the battery runs out of energy, the battery is removed from a device and discarded. The battery waste poses a social issue. Meanwhile, it is necessary to remove even a rechargeable battery from a device and charge it using a charger, causing inconvenience. Using the present disclosure, a secondary battery having a power receiving unit to receive power by wireless power feeding has a shape of a common button cell or battery and thus can be used in the same way as the button cell or battery, and accordingly can be substituted with a wireless chargeable device as it stands without device modifications. Additionally, it can be substituted with a wireless chargeable device without a special design change on the position of product providers. Furthermore, there is no need to install a cover for battery replacement in a housing of an electronic apparatus. Accordingly, it is possible to improve the product design. Moreover, since there is no need to replace the battery, it can be used to manufacture an earth-friendly electronic apparatus. Additionally, using the present disclosure, in the case of a battery type power receiving device, it is possible to achieve wireless charging in any direction of rotation around the cylinder in the same way as the battery.

MAIN ELEMENTS

10: Power feeder
11: Power feeding coil
12: Current sensor (R1)
13: Resonant condenser
14: Switching circuit
15: Frequency tuning circuit
16: Resonant state sensor
17: Control circuit
18: Power source
19: Voltage sensor
20: Power feeding base
21: Possible power feeding range
22: Groove
30: Power receiver
31: Power reception coil
33: Condenser
34: Rectifier circuit
35: Power receiving circuit board
36: Shield plate
37: Internal secondary battery
38: Power receiver housing having the same shape as battery
39: Electrode terminal (housing side)
40: Electrode terminal (inside)
41: Power receiver housing having the same shape as coin cell
42: Cylindrical coil
43: Air core coil
44: Ferrite coil
45: Power reception coil support instrument
46: Weight
47: Fixing plate
50: External secondary battery
51: External secondary battery connection terminal
60: Battery holder
70: Electronic apparatus
110: Power feeder
111: Power feeding coil
113: Resonant condenser 114: Switching circuit
115: Frequency tuning circuit
116: Resonant state sensor
117: Control circuit
118: Power source
120: Power feeding base
121: Possible power feeding range
122: Groove
130: Power receiver
131: Power reception coil
133: Condenser
134: Rectifier circuit
135: Power receiving circuit board
136: Shield plate
137: Internal secondary battery
138: Power receiver housing having the same shape as battery
139: Electrode terminal (housing side)
139A: (+ side of battery type case) electrode terminal
139B: (− side of battery type case) electrode terminal
140: Electrode terminal (inside)
140A: (+ side) electrode terminal (inside)
140B: (− side) electrode terminal (inside)

The invention claimed is:

1. A wireless power feeding system, comprising:
a power feeder including a power feeding coil to generate electromagnetic waves, and a power feeding circuit unit to supply power to generate the electromagnetic waves in the power feeding coil; and
a power receiver including a power reception coil to receive the electromagnetic waves emitted from the power feeding coil by electromagnetic induction, a power reception circuit unit to recover energy generated in the power reception coil, and an internal secondary battery to store the energy recovered by the power reception circuit unit, wherein electrical energy is supplied from the power feeder to the power receiver by the electromagnetic induction using a resonance phenomenon by a predetermined resonant frequency,
wherein the power receiver further includes:
a power receiver housing having an outer shape identical to that of an existing battery, and configured to receive the power reception coil, the power reception circuit unit and the internal secondary battery, and
two electrodes disposed in positions identical to those of the existing battery,
the power feeder further includes a power feeding base in which the power receiver is placed, and
the power receiver is mounted in a battery holder embedded in a first electronic apparatus, and in the mounted state, when placed in the power feeding base together with the first electronic apparatus, the power is supplied by charging the internal secondary battery by wireless power feeding from the power feeder to the power receiver, and at the same time, discharging to a second electronic apparatus,
wherein the power feeding circuit unit of the power feeder includes:
a resonant condenser tuned to the resonant frequency to form a parallel resonant circuit in combination with the power feeding coil,
a switching circuit which periodically repeats on (an operating state) and off (a resonant state) of power supply to the power feeding coil,
a frequency tuning circuit to change a frequency of a power source supplied to the power feeding coil,
a control circuit to control both the switching circuit and the frequency tuning circuit, and
a resonant state sensor to detect a resonant state of the power feeding coil and output a detection signal to the frequency tuning circuit and the control circuit, and
the control circuit is configured to:
set a power feeding frequency and an operating duration according to information from the resonant state sensor for an optimum resonant frequency and a stable resonant state, and control the switching circuit and the frequency tuning circuit based on the settings, and stop the power feeding when an abnormal resonant state is determined.

2. The wireless power feeding system according to claim 1, wherein the power receiver further includes an external secondary battery connection terminal for connection of an external secondary battery, and the external secondary battery is connected to the connection terminal to make a large capacity power receiver.

3. The wireless power feeding system according to claim 1, wherein the power reception coil embedded in the power receiver is a cylindrical or polygonal coil, and is an air core coil or a ferrite coil in which a coil is wound on a cylindrical or polygonal ferrite.

4. The wireless power feeding system according to claim 1, wherein the power receiver housing has an identical shape to the existing battery, and the wireless power feeding system further includes a power reception coil support instrument which is rotatable to direct the power receiver toward a predetermined direction when the power receiver is placed in the power feeding base.

5. The wireless power feeding system according to claim 1, wherein the power feeding base has a shape, form or color representing a possible power feeding range, and has at least one groove, and the groove allows the power receiver housing to be placed without rolling and is configured to place the first electronic apparatus in which the power receiver is embedded.

6. A wireless power feeding system, comprising:
a power feeder including a power feeding coil to generate electromagnetic waves, and a power feeding circuit unit to supply power to generate the electromagnetic waves in the power feeding coil; and
a power receiver including a power reception coil to receive the electromagnetic waves emitted from the power feeding coil by electromagnetic induction, a power reception circuit unit to recover energy generated from the power reception coil, and an internal secondary battery to store the energy recovered by the power reception circuit unit, wherein electrical energy is supplied from the power feeder to the power receiver by the electromagnetic induction using a resonance phenomenon by a predetermined resonant frequency,
wherein the power receiver further includes:
a power receiver housing having an outer shape identical to that of an existing battery, and configured to receive the power reception coil, the power reception circuit unit and the internal secondary battery, and
two electrodes disposed in positions identical to those of the existing battery,
the power feeder further includes a power feeding base in which the power receiver is placed, and
the power reception coil of the power receiver is a ferrite coil having windings on one ferrite in a plurality of winding directions, each winding connected in series, the power reception coil through which a magnetic flux passes in any rotation direction to generate an electromotive force by the electromagnetic induction, wherein the power feeding circuit unit of the power feeder includes:
- a resonant condenser tuned to the resonant frequency to form a parallel resonant circuit in combination with the power feeding coil,
- a switching circuit which periodically repeats on (an operating state) and off (a resonant state) of power supply to the power feeding coil,
- a frequency tuning circuit to change a frequency of a power source supplied to the power feeding coil,
- a control circuit to control both the switching circuit and the frequency tuning circuit, and
- a resonant state sensor to detect a resonant state of the power feeding coil and output a detection signal to the frequency tuning circuit and the control circuit, and the control circuit is configured to:
- set a power feeding frequency and an operating duration according to information from the resonant state sensor for an optimum resonant frequency and a stable resonant state, and control the switching circuit and the frequency tuning circuit based on the settings, and
- stop the power feeding when an abnormal resonant state is determined.

7. The wireless power feeding system according to claim 6, wherein the power receiver housing has an identical shape to the existing battery and is mounted on a battery holder embedded in a first electronic apparatus, and in the mounted state, when placed in the power feeding base together with the first electronic apparatus, the power is supplied by charging the internal secondary battery by wireless power feeding from the power feeder to the power receiver, and at the same time, discharging to a second electronic apparatus.

8. The wireless power feeding system according to claim 7, wherein in the power receiver, the internal secondary battery is embedded in a spherical or polygonal case,
- the winding of the ferrite coil as the power reception coil of the power receiver is a ferrite coil having windings on at least one ferrite in at least 3 directions, each winding connected in series, and
- even in case that the power receiver faces any direction with respect to the power feeder and is even rolling, the power is supplied by charging the internal secondary battery by wireless power feeding, and at the same time, discharging to the second electronic apparatus.

* * * * *